(12) United States Patent
Shimohira et al.

(10) Patent No.: US 7,521,144 B2
(45) Date of Patent: Apr. 21, 2009

(54) MEMBRANE-ELECTRODE ASSEMBLY FOR POLYMER ELECTROLYTE FUEL CELLS, AND POLYMER ELECTROLYTE FUEL CELL

(75) Inventors: Tetsuji Shimohira, Yokohama (JP); Shinji Kinoshita, Yokohama (JP); Hirokazu Wakabayashi, Yokohama (JP); Ichiro Terada, Ayase (JP); Yoshihiro Hori, Ikoma (JP)

(73) Assignees: Asahi Glass Company, Limited, Tokyo (JP); Panasonic Corporation, Kadoma-shi (JP)

( * ) Notice: Subject to any disclaimer, the term of this patent is extended or adjusted under 35 U.S.C. 154(b) by 39 days.

(21) Appl. No.: 11/213,888

(22) Filed: Aug. 30, 2005

(65) Prior Publication Data

US 2006/0046121 A1    Mar. 2, 2006

(30) Foreign Application Priority Data

Aug. 30, 2004 (JP) ............................. 2004-250241
Aug. 30, 2004 (JP) ............................. 2004-250271
Aug. 30, 2004 (JP) ............................. 2004-250285

(51) Int. Cl.
   *H01M 8/10* (2006.01)
   *H01M 2/08* (2006.01)
(52) U.S. Cl. .............................. 429/35; 429/30; 429/33
(58) Field of Classification Search .................. 429/35, 429/33, 30
   See application file for complete search history.

(56) References Cited

U.S. PATENT DOCUMENTS

| 5,264,299 A | * | 11/1993 | Krasij et al. .................. 429/30 |
| 5,464,700 A | | 11/1995 | Steck et al. |
| 2003/0215690 A1 | * | 11/2003 | Wald et al. .................... 429/35 |
| 2004/0096730 A1 | * | 5/2004 | Kuroki et al. ................. 429/44 |
| 2005/0249994 A1 | * | 11/2005 | McLean et al. ............... 429/34 |
| 2006/0046121 A1 | | 3/2006 | Shimohira et al. |
| 2006/0159973 A1 | | 7/2006 | Kotera et al. |

FOREIGN PATENT DOCUMENTS

| JP | 5-21077 | 1/1993 |
| JP | 5-174845 | 7/1993 |
| JP | 5-242897 | 9/1993 |
| JP | 7-501417 | 2/1995 |
| JP | 7-220742 | 8/1995 |

(Continued)

OTHER PUBLICATIONS

IPDL JPO Machine Translation for JP 11-204122A (publication date Jul. 1999).*

*Primary Examiner*—Patrick Ryan
*Assistant Examiner*—Eugenia Wang
(74) *Attorney, Agent, or Firm*—Oblon, Spivak, McClelland, Maier & Neustadt, P.C.

(57) ABSTRACT

The present invention provides a membrane-electrode assembly for polymer electrolyte fuel cells and a polymer electrolyte fuel cell having excellent dimensional stability and mechanical strength, and having high durability at the time of a power generation. Each of polymer electrolyte membranes (111, 211, 311) have a region 1 having proton conductivity over the entirety in the thickness direction of the membrane and a region 2 located at the outer peripheral portion of the region 1 and having a non-porous sheet disposed so that the region 2 has no proton conductivity over the entirety in the thickness direction of the membrane, and outer edges of the catalyst layers (127, 128) are disposed so as to be located in the area 2.

19 Claims, 16 Drawing Sheets

FOREIGN PATENT DOCUMENTS

| | | |
|---|---|---|
| JP | 8-185872 | 7/1996 |
| JP | 8-259710 | 10/1996 |
| JP | 9-289028 | 11/1997 |
| JP | 10-154521 | 6/1998 |
| JP | 10-308228 | 11/1998 |
| JP | 11-204122 | 7/1999 |
| JP | 11-204122 A * | 7/1999 |
| JP | 2000-215903 | 8/2000 |
| JP | 2000-260443 | 9/2000 |
| JP | 3245161 | 1/2002 |
| JP | 3368907 | 11/2002 |
| JP | 2005-216769 | 8/2005 |
| JP | 2005-302526 | 10/2005 |
| WO | WO 02/43172 * | 5/2002 |

* cited by examiner

REGION 1
REGION 2
113
118

REGION 2
125
133
153

REGION 1
REGION 2
REGION 3
213
118
151

REGION 2
REGION 3
213
133
153
151

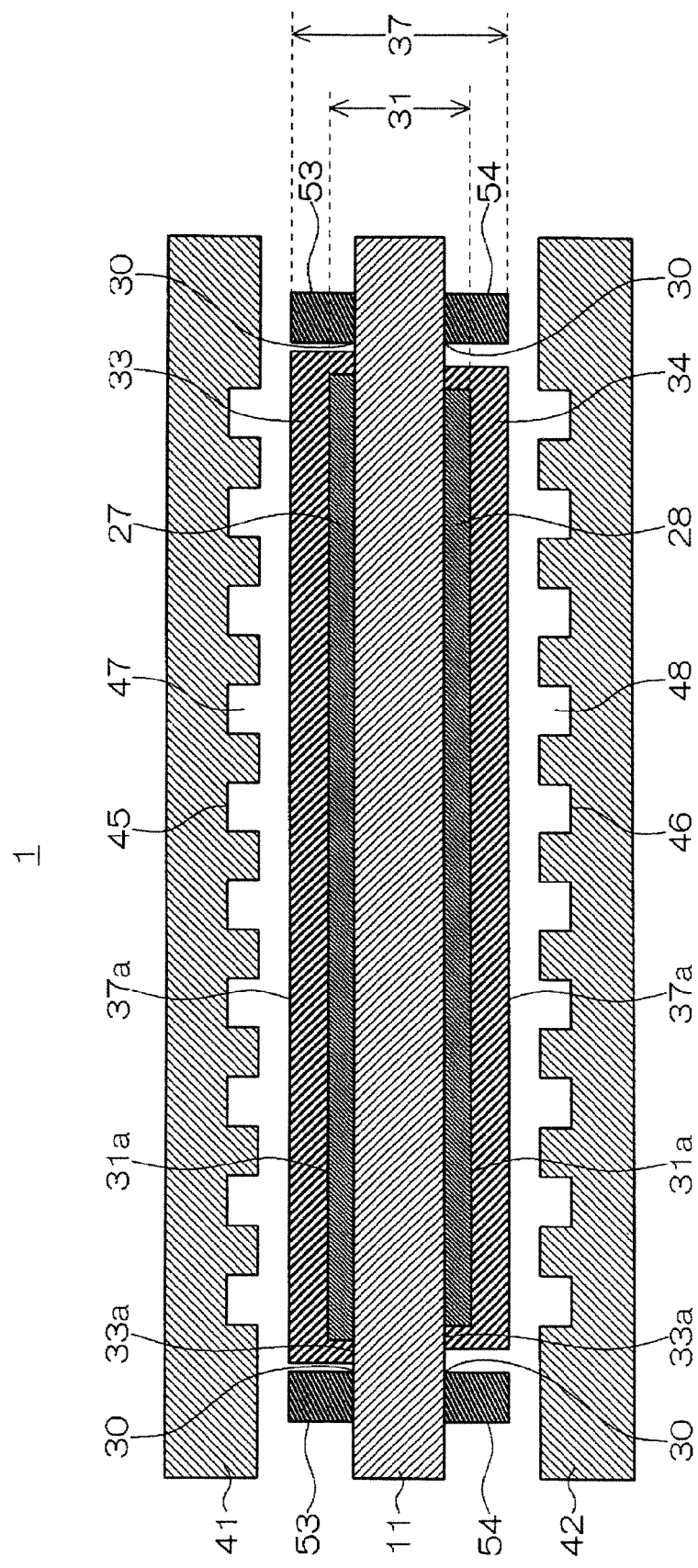

MEMBRANE-ELECTRODE ASSEMBLY FOR POLYMER ELECTROLYTE FUEL CELLS, AND POLYMER ELECTROLYTE FUEL CELL

TECHNICAL FIELD

The present invention relates to a membrane-electrode assembly for polymer electrolyte fuel cells, and a polymer electrolyte fuel cell. Particularly, it relates to a membrane-electrode assembly for polymer electrolyte fuel cells, and a polymer electrolyte fuel cell having excellent dimensional stability and mechanical strength, and having high durability at the time of power generation.

BACKGROUND ART

Fuel cells are expected to be widely used in the future since their power generation efficiency is high, and their load to the environment is light. Particularly polymer electrolyte fuel cells are expected to be widely used for movable bodies such as automobiles, or as distributed power generation system, or cogeneration systems for home use, since their power density is high and their operating temperature is low, whereby downsizing can be carried out.

A cross-sectional view of a single cell for conventional fuel cells is shown in FIG. 17. In FIG. 17, a single cell 1 for fuel cells has a polymer electrolyte membrane 11. This polymer electrolyte membrane 11 usually has a thickness of from about 20 to 120 μm, and a cation exchange membrane made of a perfluorocarbon polymer having chemically stable sulfonic groups is used for it.

Further, two catalyst layers 27 and 28 each containing a metal catalyst are bonded to both outer surfaces 11a of the polymer electrolyte membrane 11. These catalyst layers 27 and 28 are formed on the center portion of the polymer electrolyte membrane 11, and a portion not bonded to the catalyst layers 27 and 28 is left along its periphery.

Further, a membrane-catalyst layer assembly 31 is constituted by such a polymer electrolyte membrane 11 and catalyst layers 27 and 28, and gas diffusion layers 33 and 34 are respectively disposed on both outer surfaces 31a of the membrane-catalyst layer assembly 31 on the side of the catalyst layers 27 and 28. In order to conduct electrons entering into or leaving from the catalyst layers 27 and 28, these gas diffusion layers 33 and 34 have sizes which are the same as or larger than the sizes of the catalyst layers 27 and 28, and they are formed from e.g. carbon paper or carbon cloth.

However, as shown in FIG. 18, the gas diffusion layers 33 and 34 may be disposed to cover not only the surfaces of such catalyst layers 27 and 28 but also their sides. In such a case, the gas diffusion layers 33 and 34 may also be contacted with the polymer electrolyte membrane 11 at contact surfaces 33a.

Further, a membrane-electrode assembly 37 is constituted by the membrane-catalyst layer assembly 31 and the gas diffusion layers 33 and 34, and, on both outer surfaces 37a of the membrane-electrode assembly 37, on the side of the gas diffusion layers 33 and 34, gas channels 47 and 48 are formed between them and separators 41 and 42.

Here, the separators 41 and 42 have such sizes as to cover the entire surface of the polymer electrolyte membrane 11, and concave grooves 45 and 46 are engraved at the respective portions facing the catalyst layers 27 and 28, so that when the separators 41 and 42 and the membrane-electrode assembly 37 are fastened, such grooves 45 and 46 will form the gas channels 47 and 48.

Furthermore, at the portions of the separators 41 and 42 facing the portions of the membrane-electrode assembly 37 where the catalyst layers 27 and 28 are not bonded, gaskets 53 and 54 are located for sealing so that a fuel gas and an oxidant gas will not leak to outside, and when the separators 41 and 42 and the membrane-electrode assembly 37 are assembled, such gaskets are interposed between the separators 41 and 42 and the polymer electrolyte membrane 11, so that the gas channels 47 and 48 are sealed against outside.

As described above, a single cell 1 is constructed as a minimum unit for power generation by a fuel cell, and in a case of using such single cells 1 for fuel cells, a plurality of single cells 1 may be used as laminated or stacked so as to generate a practical voltage.

In such a construction, hydrogen is supplied to the anode (catalyst layer 28) side of the single cell 1. On the other hand, oxygen or air is supplied to the cathode (catalyst layer 27) side. At that time, hydrogen, oxygen and air are supplied through the gas channels 47 and 48. As a result, a reaction of $H_2 \rightarrow 2H^+ + 2e^-$ takes place on the anode side. $H^+$ (proton) produced on the anode side transfers to the cathode side through the polymer electrolyte membrane 11, and $e^-$ (electron) transfers to the cathode side via an external circuit. On the other hand, on the cathode side, the proton transferred from the anode side through the membrane, the electron transferred via the external circuit and oxygen supplied are reacted, whereby a reaction represented by $\frac{1}{2}O_2 + 2H^+ + 2e^- \rightarrow H_2O$ takes place.

Thus, in a fuel cell having the single cell 1, chemical energy can be converted to electric energy. In order for the proton to pass through the polymer electrolyte membrane 11, the polymer electrolyte membrane 11 is required to be in such a state that it holds water. Therefore, in order to carry out such a reaction efficiently, gases to be supplied to the anode and the cathode are humidified and then supplied thereto.

However, in a fuel cell constructed as described above, at end portions 31b of electrode-catalyst layers shown by a dotted line circle in FIG. 17, at contact surfaces 33a from end portions of catalyst layers 27 and 28 to end portions of the gas diffusion layers 33 and 34 in FIG. 18, or at end portions 30 (portions in contact with the polymer electrolyte membrane 11) of the gaskets 53 and 54 at the side of the catalyst layers 27 and 28, there has been a problem such that the polymer electrolyte membrane 11 tends to have holes, or short circuiting of electrodes is likely to occur though the reason is not clearly understood.

As causes of troubles at the end portions 31b of the electrode catalyst layer in FIG. 17, it is presumed that the pressure at the time of bonding electrodes is exerted on the end portions so strongly that the polymer electrolyte membrane 11 is likely to be damaged, or a creep phenomenon occurs at the end portions 31b of the electrode catalyst layer, since the pushing pressure is exerted from both sides of the membrane-electrode assembly 37 also during the operation, whereby gas leakage increases and a local burning reaction takes place, to cause membrane decomposition or short circuiting. Accordingly, it is considered advisable that the portions where the polymer electrolyte membrane 11 and the catalyst layers 27 and 28 are bonded at the end portions 31b of the electrode catalyst layer, have a reinforced structure.

As a means for solving the above problems, a membrane-electrode assembly has been proposed which has a structure such that reinforcing frames made of polymer sheets are interposed between the end portions of electrode catalyst layers and the polymer electrolyte membrane (Patent Documents 1 and 2). However, in the case of this membrane-electrode assembly, there is a problem that membrane damage occurs in the vicinity of end portions inside of the reinforcing frames, though membrane damage at the end portions of the electrode catalyst layers can be suppressed.

Accordingly, a membrane not substantially containing a reinforcing material in the vicinity of the center of the conductive portion of the polymer electrolyte membrane and containing a reinforcing material such as fiber, fabric, fibril or porous membrane in the vicinity of the boundary between the conductive portion and the non-conductive portion around it, has been proposed (see Patent Documents 3 and 4). However, in the case of this membrane, in the vicinity of the center, its strength is insufficient though resistance is low, and the gas permeability of the reinforced portions is suppressed but the suppression is still insufficient, and during a long-term operation, a defect of the membrane or short circuiting was likely to occur in the vicinity of the end portions of the electrode catalyst layers.

Further, a membrane-electrode assembly has been proposed, which is prepared in such a manner that holes of 3 mmΦ are formed in 7 rows×7 columns on a polytetrafluoroethylene (PTFE) film so that the distance between the centers of adjacent holes is 6 mm, a perfluorosulfonic acid polymer is impregnated in the holes and dried to prepare a membrane having a conductive portion with an area of 39 mm×39 mm, and then electrodes of 50 mm×50 mm are bonded on both sides of the membrane (see Patent Document 5). However, in such a case, there was such a problem that the proton conductivity in the vicinity of its center is insufficient though proton conductivity at the peripheral portions is low, whereby the power generation property is low.

On the other hand, as causes of troubles on the contact surfaces 33a from the end portions of the catalyst layers 27 and 28 to the end portions of the gas diffusion layers 33 and 34 in FIG. 18, it is presumed that the pressure at the time of bonding the gas diffusion layers 33 and 34 is exerted on their end portions so strongly that the polymer electrolyte membrane 11 is likely to be damaged, the pushing pressure is exerted on the membrane-electrode assembly 37 also during the operation, whereby the gas diffusion layers 33 and 34 having relatively large irregularities on their surfaces are pushed at portions in direct contact with the polymer electrolyte membrane 11 to decrease the membrane thickness, and outside of the outer edges of the catalyst layers 27 and 28, supplied gas is not consumed and is likely to remain, whereby the gas concentration becomes high and the gas permeability becomes high.

As a result, it is considered that a burning reaction locally takes place, and membrane decomposition or short circuiting occurs. Therefore, a polymer electrolyte membrane having such a structure that portions of the contact surfaces 33a are reinforced, is considered to be preferred.

As a means for solving the above problems, a membrane-electrode assembly has been proposed, which is prepared in such a manner that a sealing material of tetrafluoroethylene/propylene copolymer is applied on peripheral portions of the gas diffusion layers and dried to prepare assistant gaskets having a width of from 2 to 10 mm and a thickness of 60 μm, and catalyst layers are formed inside of such gaskets and then bonded with an ion exchange membrane (see Patent Document 6).

However, in the case of this membrane-electrode assembly, it is difficult to prepare the assistant gaskets and to form catalyst layers precisely in it. Therefore, there is such a problem that the catalyst layers are likely to overlap on the assistant gaskets to form defects.

Further, a membrane-electrode assembly has been proposed, which is prepared in such a manner that on center portions of gas diffusion layers, catalyst layers with a smaller area are respectively applied and dried, followed by bonding with an ion exchange membrane having fluororesin sheets with an opening of the same size as the catalyst layers bonded thereto (see Patent Document 7).

However, misalignment may occur at the time of bonding the above gas diffusion layers with the ion exchange membrane, and the catalyst layers and the fluororesin sheets may overlap to form defects.

Further, a membrane-electrode assembly has been proposed, which is prepared in such a manner that a fluororesin sheet having an opening with a certain size is bonded on each side of an ion exchange membrane, a catalyst layer with the same size as the opening is applied to the opening and dried, and then a gas diffusion layer larger than the opening is bonded to the catalyst layer (see Patent Document 8).

However, it is difficult to apply the catalyst layer with the same size as the opening, and the catalyst layer and the fluororesin sheet are likely to overlap to form defects.

Further, as a cause of the trouble of the gaskets 53 and 54 at the end portions 30 on the side of catalyst layers 27 and 28, it is presumed that the pressure at the time of bonding of the gaskets 53 and 54 is exerted on the end portions so strongly that the polymer electrolyte membrane 11 is likely to be damaged, the pushing pressure is exerted on the gaskets 53 and 54 also during the operation, whereby the gaskets 53 and 54 having relatively large irregularities on their surface are pushed at portions in direct contact with the polymer electrolyte membrane 11 to decrease the membrane thickness, and outside of the outer edges of the catalyst layers 27 and 28, supplied gas is not consumed, and is likely to remain, whereby the gas concentration becomes high, and the gas permeability becomes high.

As a result, it is considered that a burning reaction locally take place, and a membrane decomposition or short circuiting occurs. Therefore, a polymer electrolyte membrane is considered to be preferred, which has such a structure that the vicinity of the inner portions 30 of the gaskets 53 and 54 is reinforced.

As a means for solving the above problems, a membrane-electrode assembly has been proposed, which has such a structure that reinforcing frames of a polymer sheet are interposed between gaskets and a polymer electrolyte membrane (see Patent Document 2).

However, in the case of such a membrane-electrode assembly, there is a problem that the membrane is damaged in the vicinity of the end portions inside of the reinforcing frames, though the membrane damage at the end portions of gaskets can be suppressed.

Also with respect to such problems, it is conceivable to solve them by membranes as described in the Patent Documents 3 to 5. However, also in such cases, there will be the same problems as the problems caused by the membranes as described in the above-mentioned Patent Documents 3 to 5.

Patent Document 1: Japanese Patent Publication 3245161 (claim 1)
Patent Document 2: Japanese Patent Publication 3368907 (claim 1)
Patent Document 3: JP-A-2000-260443 (claims 1 and 3)
Patent Document 4: JP-A-8-259710 (Example 3)
Patent Document 5: JP-A-2000-215903 (Example 3)
Patent Document 6: JP-A-7-220742 (Example 1)
Patent Document 7: JP-A-10-154521 (Example 1)
Patent Document 8: JP-A-10-308228 (Example 3)

DISCLOSURE OF THE INVENTION

Problems that the Invention is to Solve

The present invention has been made under such conventional problems, and it is an object of the present invention to provide a membrane-electrode assembly for polymer electrolyte fuel cells and a polymer electrolyte fuel cell having excellent dimensional stability and mechanical strength, and having high durability at the time of power generation.

Means of Solving the Problems

The present invention is to achieve the above object, and has the following gists.

(1) A membrane-electrode assembly for polymer electrolyte fuel cells, which comprises a polymer electrolyte membrane, and electrodes comprising catalyst layers containing a catalyst, disposed on both sides of the polymer electrolyte membrane, and gas diffusion layers supporting the catalyst layers inside of their peripheral portions, characterized in that the polymer electrolyte membrane has a first region having proton conductivity over the entirety in the thickness direction of the membrane and a second region, located at the outer peripheral portion of the first region and having a non-perforated sheet disposed so that the second region has no proton conductivity over the entirety in the thickness direction of the membrane, and outer edges of the catalyst layers are disposed so as to be located in the second region.

The outer edges of the catalyst layers are disposed so as to be located in the second region, so that the increase of gas leakage is suppressed even when the pressure is strongly exerted on the ends of the electrode catalyst layers during bonding of the electrodes or even when the polymer electrolyte membrane is partly damaged by creeping during the operation, whereby it is possible to prevent deterioration of the polymer electrolyte membrane or short circuiting of the electrode due to e.g. a local burning reaction. Thus, it is possible to provide a membrane-electrode assembly for fuel cells having a long life.

(2) The membrane-electrode assembly wherein entire regions of from the outer edges of the catalyst layers to the outer edges of the gas diffusion layers are located in the second region.

The entire regions of from the outer edges of the catalyst layers to the outer edges of the gas diffusion layers are disposed so as to be located in the second region, so that the increase of gas leakage is suppressed even when the pressure is strongly exerted on the ends of the gas diffusion layers during bonding of the gas diffusion layers or even when the polymer electrolyte membrane is partly damaged by creeping during the operation, whereby it is possible to prevent deterioration of the polymer electrolyte membrane or short circuiting of the electrode caused by e.g. a local burning reaction. Thus, a polymer electrolyte membrane-electrode assembly for fuel cells having a long life, can be obtained.

(3) The membrane-electrode assembly according to the above (1) or (2), wherein the outer peripheral portions of the gas diffusion layers are disposed inside of the peripheral portion of the polymer electrolyte membrane; on both sides of the polymer electrolyte membrane, gaskets having inner peripheral portions located outside of the outer peripheral portions of the electrodes, are disposed so as to sandwich the polymer electrolyte membrane; and the inner peripheral portions of the gaskets are disposed so as to be in contact with the polymer electrolyte membrane, in the second region.

The inner peripheral portions of the gaskets are disposed so as to be located in the second region so that the increase of gas leakage is suppressed even when the pressure is strongly exerted on the polymer electrolyte membrane during bonding of the gaskets or even when the polymer electrolyte membrane is partly damaged by creeping during the operation, whereby it is possible to prevent deterioration of the polymer electrolyte membrane or short circuiting of the electrode caused by e.g. a local burning reaction. Thus, a membrane-electrode assembly for fuel cells having a long life, can be obtained.

(4) The membrane-electrode assembly according to any one of the above (1) to (3), wherein the polymer electrolyte membrane has a third region having proton conductivity in a further outer peripheral portion of the second region.

Thus, setting of the third region, allows also the peripheral portion of the membrane to have proton conductivity. Therefore, for example, in a case where the polymer electrolyte membrane is formed from a perforated sheet and an ion exchange resin, it is possible to prevent peeling of the perforated sheet and the ion exchange resin.

Here, the proton conductivities in the first and third regions are not particularly limited so long as they are in such a range that the effect of the present invention can be obtained, and the range is practically from about 0.01 to about 0.5 S/cm. The proton conductivity in the second region is at most 0.001 S/cm which is sufficiently lower than those of the first and third regions.

(5) The membrane-electrode assembly according to any one of the above (1) to (4), wherein the polymer electrolyte membrane has a filled layer comprising at least one reinforcing material selected from the group consisting of a fibrous reinforcing material, a fibrillated reinforcing material, a porous membrane, a woven fabric, a non-woven fabric and a perforated sheet having a plurality of through-holes formed, and an ion exchange resin filled in void portions of the reinforcing material; in the first region, the reinforcing material has void portions and has proton conductivity through the void portions; and in the second region, the reinforcing material has no void portions.

As the ion exchange resin is filled in the void portions in the first region, the polymer electrolyte membrane which constitutes the membrane-electrode assembly is further reinforced by the reinforcing material. Further, the proton conductivity is secured by the ion exchange resin filled in the void portions. By such reinforcement of the first region, it is possible to improve the strength of the polymer electrolyte membrane and make it hardly be damaged. Materials of the reinforcing material in the first region and the reinforcing material in the second region may be different, but are preferably the same and further preferably structurally integral.

Here, in the second region, the reinforcing material does not have void portions. Therefore, in a case where the reinforcing material is made of a perforated sheet having through-holes formed, it is possible to use a perforated sheet having through-holes formed in the first region and having no through-holes formed in the second region. On the other hand, in a case where such a reinforcing material is made of e.g. a fibrous reinforcing material or a woven fabric, the reinforcing material in the first region and a non-perforated sheet in the second region may be prepared separately such that such a reinforcing material is disposed in the first region and a sheet formed with no through-holes is disposed in the second region. At that time, the reinforcing material in the first region and the non-perforated sheet may or may not be bonded. If they are not bonded, the reinforcing material in the first region and the non-perforated sheet may be bonded by filling the ion exchange resin.

(6) The membrane-electrode assembly according to the above (5), wherein the polymer electrolyte membrane has the filled layer and a resin layer made solely of an ion exchange resin, formed on at least one side of the filled layer.

The polymer electrolyte membrane may be made solely of the filled layer having respective void portions filled with the ion exchange resin. However, it is preferred that a layer made solely of the ion exchange resin is formed on at least one side of the filled layer to constitute such a polymer electrolyte membrane, whereby electroconductivity will be increased. Here, the ion exchange resin filled in the void portions may be the same or different from the ion exchange resin of the layer formed on the filled layer.

However, the layer formed on the filled layer is not reinforced by the filled layer, and therefore, as the ion exchange resin constituting such a layer, it may be effective to use a different resin, such as a resin having a strength higher than that of the ion exchange resin filled in the void portions, such as a resin having a low ion exchange capacity.

Further, the layer having the void portions filled with the ion exchange resin is reinforced by the filled layer, and therefore, the strength of the ion exchange resin itself may not be so high. Accordingly, an ion exchange resin having a high ion exchange capacity and not having high strength may be used to increase the electroconductivity of the obtainable polymer electrolyte membrane.

(7) The membrane-electrode assembly according to the above (5) or (6), wherein the reinforcing material is made of a perforated sheet having a plurality of through-holes formed in the first region and having no through-holes formed in the second region.

By filling the ion exchange resin in the through-holes, the polymer electrolyte membrane which constitutes the membrane-electrode assembly of the present invention is reinforced by the perforated sheet. As the material for the perforated sheet, one having substantially no ion exchange groups is used, but since a plurality of through-holes are present in the first region, and the ion exchange resin is filled therein, the proton conductivity is secured in a humidified atmosphere.

(8) The membrane-electrode assembly according to the above (7), wherein the through-holes have an average area per through-hole of from $1\times10^{-3}$ to 20 mm$^2$ and are formed substantially parallel to the thickness direction of the perforated sheet, and the first region in the perforated sheet has an open area ratio of from 30 to 80%, by the through-holes.

In a case where the average cross-sectional area per through-hole is too small, if it is attempted to maintain the open area ratio within a certain range, the number of the through-holes per unit area is obliged to be so large that the productivity tends to be low or filling of the ion exchange resin tends to be difficult. On the other hand, in a case where the average cross-sectional area per through-hole is too large, the polymer electrolyte membrane obtainable cannot be uniformly reinforced, and as a result, the strength tends to be insufficient. Accordingly, the average cross-sectional area per through-hole is preferably from $1\times10^{-3}$ to 20 mm$^2$.

If the open area ratio of the perforated sheet is lower than 30%, the resistance of the polymer electrolyte membrane finally obtainable tends to be high. If the open area ratio of the perforated sheet is higher than 80%, the strength of the polymer electrolyte membrane tends to remarkably decrease. Therefore, the open area ratio of the perforated sheet is preferably from 30 to 80%.

(9) The membrane-electrode assembly according to the above (7) or (8), wherein the polymer electrolyte membrane has a third region having proton conductivity at a further outer peripheral portion of the second region, the perforated sheet has a plurality of through-holes in the third region, and the polymer electrolyte membrane has proton conductivity in the thickness direction through the through-holes.

Thus, setting of the third region formed with the through-holes, allows the ion exchange resins on both surfaces to be connected through the through-holes of the perforated sheet also at the peripheral portion of the membrane, whereby it is possible to prevent peeling of the perforated sheet and the ion exchange resins.

(10) The membrane-electrode assembly according to any one of the above (7) to (9), wherein in at least one of boundary portions where the respective regions are in contact, the average area per through-hole of the through-holes gradually becomes small or the number of through-holes per unit area gradually decreases towards the second region.

Thus, it is possible to prevent concentration of stress at boundary portions where the respective regions are in contact.

(11) The membrane-electrode assembly according to any one of the above (6) to (10), wherein the perforated sheet is made of a material having a water content of at most 5% after immersion in hot water at 90° C.

If the water content is higher than 5%, creep is likely to occur by the pushing pressure during bonding of the catalyst layers or during operation of the fuel cell, so that the polymer electrolyte membrane is damaged and gas permeability increases, such being undesirable.

(12) The membrane-electrode assembly according to any one of the above (1) to (11), wherein the material (constituting material) for the perforated sheet is at least one member selected from the group consisting of a polytetrafluoroethylene, a tetrafluoroethylene/hexafluoropropylene copolymer, a tetrafluoroethylene/perfluoroalkoxyethylene copolymer, a tetrafluoroethylene/ethylene copolymer, a polyethylene, a polypropylene, a polyetheramide, a polyetherimide, a polyether ketone, a polyether ether ketone, a polysulfone, a polyether sulfone, a polyphenylene sulfide, a polyphenylene oxide, a polyphosphazene, a polyarylate, a polyimide, a polyamide-imide and a polybenzimidazole.

Such a perforated sheet may have poor bonding properties depending upon the material, and is preferably surface-treated to improve its bonding properties with the ion exchange resin.

Further, the present invention (claim 13) provides a polymer electrolyte fuel cell, which comprises laminated cells, each having separators disposed on both sides of the membrane-electrode assembly as defined in any one of claims 1 to 12.

Thus, a polymer electrolyte fuel cell provided with a polymer electrolyte membrane-electrode assembly having excellent dimensional stability and mechanical strength, and having high durability at the time of power generation will be presented.

EFFECT OF THE INVENTION

According to the present invention, the outer edges of the catalyst layers are disposed so as to be located in the second region so that the increase of gas leakage is suppressed even when the pressure is strongly exerted on the ends of electrode catalyst layers during bonding of the electrodes or even when the polymer electrolyte membrane is partly damaged by creep during the operation, whereby it is possible to prevent deterioration of the polymer electrolyte membrane or short circuiting of the electrodes caused by e.g. a local burning reaction. Thus, it is possible to provide a membrane-electrode assembly for fuel cells having a long life.

BRIEF DESCRIPTION OF THE DRAWINGS

FIG. 18 is a cross-sectional view illustrating another example of a single cell for conventional fuel cells.

Figure 1:
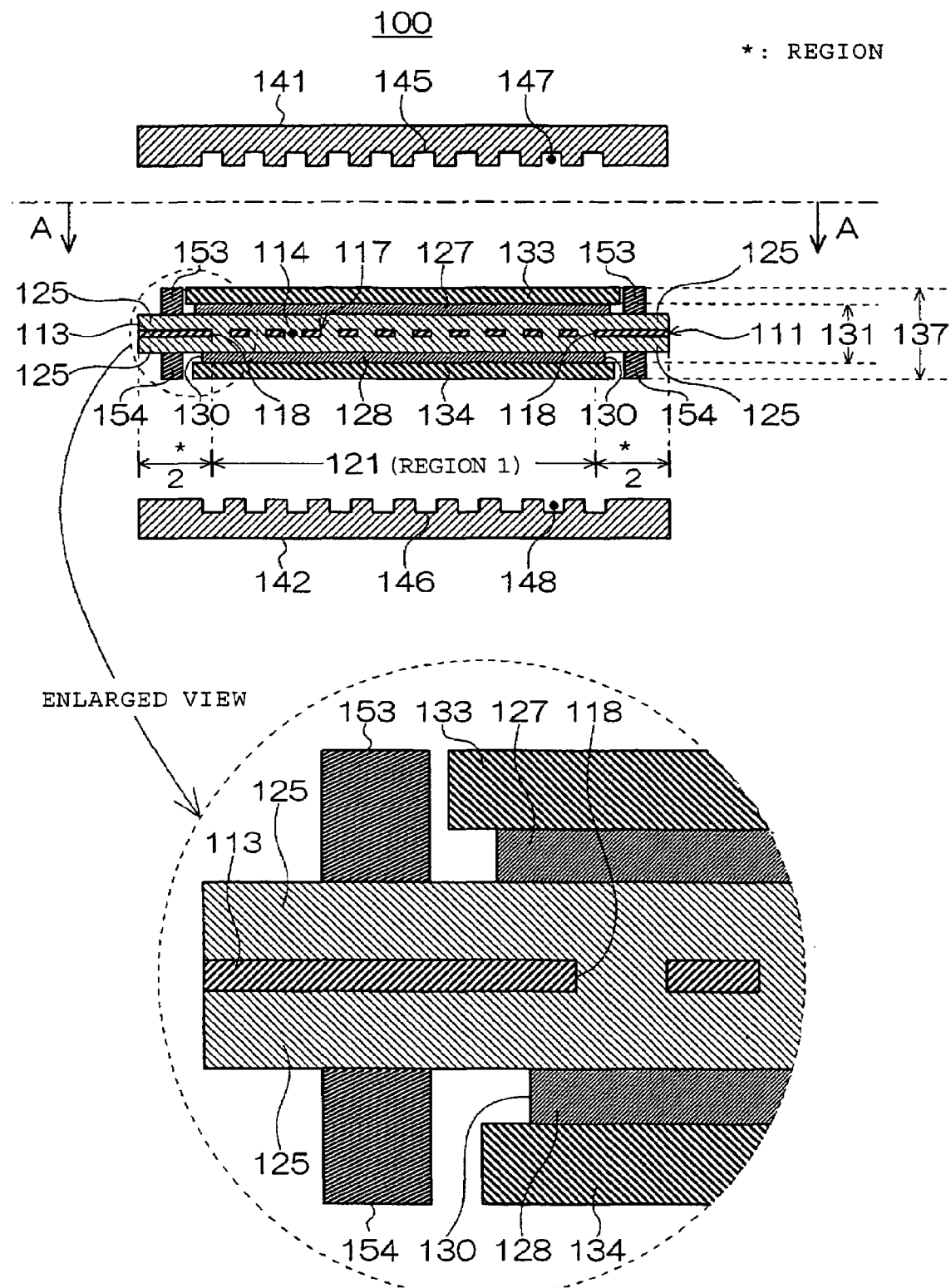
FIG. 1 is a cross-sectional view illustrating a single cell for fuel cells as the first embodiment of the present invention.

MEANINGS OF SYMBOLS 1, 100, 200, 300, 400, 500, 600, 700: Single cell
11, 111, 211, 311: Polymer electrolyte membrane
11a: Both outer surfaces of polymer electrolyte membrane
27, 28, 127, 128: Catalyst layer
31, 131, 231, 331: Membrane-catalyst layer assembly
31a: Each outer surface of membrane-catalyst layer assembly
31b: End portion of an electrode catalyst layer
33, 34, 133, 134: Gas diffusion layer
33a, 133a: Contact surface
37, 137, 237, 337: membrane-electrode assembly
37a: Each outer surface of membrane-catalyst layer assembly
41, 42, 141, 142: Separator
45, 46, 145, 146: Groove
47, 48, 147, 148: Gas channel
53, 54, 153, 154: Gasket
113, 213: Perforated sheet
114: Filled layer
117: Through-hole
118, 151: Partition line
121: Center region
125: Resin layer
130: Catalyst layer end edge
140: Gas diffusion layer end edge
137: Membrane-electrode assembly
300: Inner peripheral portion of catalyst layer side of the gasket
313: Frame-shaped reinforcing material

BEST MODE FOR CARRYING OUT THE INVENTION

Now, practical embodiments of the present invention will be described. A cross-sectional view illustrating a single cell for fuel cells as the first embodiment of the present invention is shown in FIG. 1. In FIG. 1, a plurality of through-holes 117 are formed in a center region 121 (hereinafter referred to as the region 1) of a perforated sheet 113 constituting a single cell 100. A region 2 having no through-holes 117 formed, is provided at the periphery surrounding the region 1.

Figure 2:
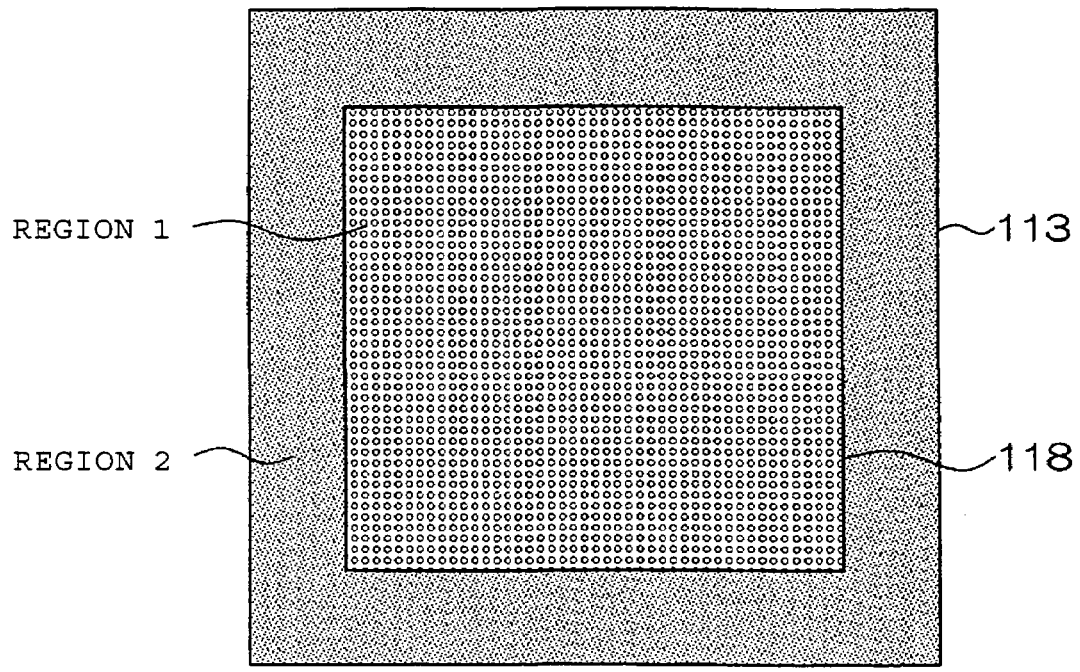
FIG. 2 is a plan view illustrating a perforated sheet.

Here, a partition line 118 for partitioning the region 1 and the region 2 is virtually defined. A plan view illustrating such a perforated sheet 113 is shown in FIG. 2.

Figure 4:
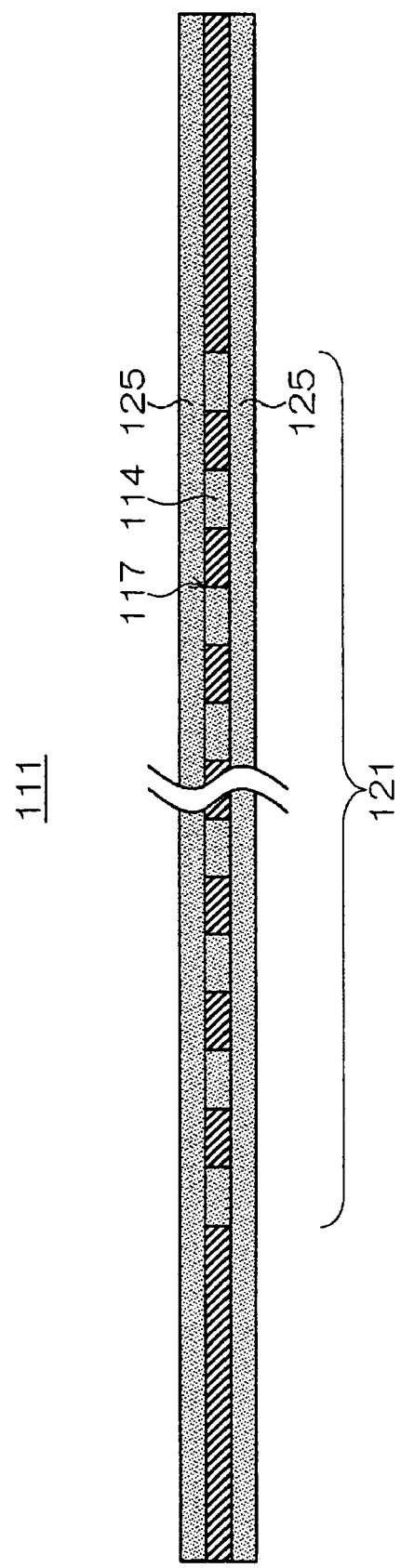
FIG. 4 is a vertically sectional view illustrating a polymer electrolyte membrane.

Further, such through-holes 117 are filled with an ion exchange resin to form a filled layer 114. Further, on both outer surfaces of such a perforated sheet 113, resin layers 125 made of the same ion exchange resin are connected to form a polymer electrolyte membrane 111. The vertically sectional view illustrating such a polymer electrolyte membrane 111 is shown in FIG. 4.

Further, catalyst layers 127 and 128 are respectively bonded on both outer surfaces of the polymer electrolyte membrane 111. Such catalyst layers 127 and 128 are formed in the center portion of the polymer electrolyte membrane 111, and a portion not being bonded with the catalyst layers 127 and 128 is left in its periphery. The outer edges of the catalyst layers 127 and 128 are disposed so as to be located in the region 2.

A membrane-catalyst layer assembly 131 is constituted by such a polymer electrolyte membrane 111 and catalyst layers 127 and 128, and gas diffusion layers 133 and 134 are respectively disposed on both outer surfaces of the membrane-catalyst layer assembly on the side of the catalyst layers 127 and 128. In order to collect electrons entering or leaving from the catalyst layers 127 and 128 efficiently, such gas diffusion layers 133 and 134 have sizes which are the same as or larger than the sizes of the catalyst layers 127 and 128.

Further, A membrane-electrode assembly 137 is constituted by the membrane-catalyst layer assembly 131 and the gas diffusion layers 133 and 134, and, on both outer surfaces of the membrane-electrode assembly 137 on the side of the gas diffusion layers 133 and 134, gas channels 147 and 148 are formed between them and separators 141 and 142. Here, the separators 141 and 142 have the same sizes as the entire surface of the polymer electrolyte membrane 111, and concave grooves 145 and 146 are engraved at their respective portions facing the catalyst layers 127 and 128.

Figure 3:
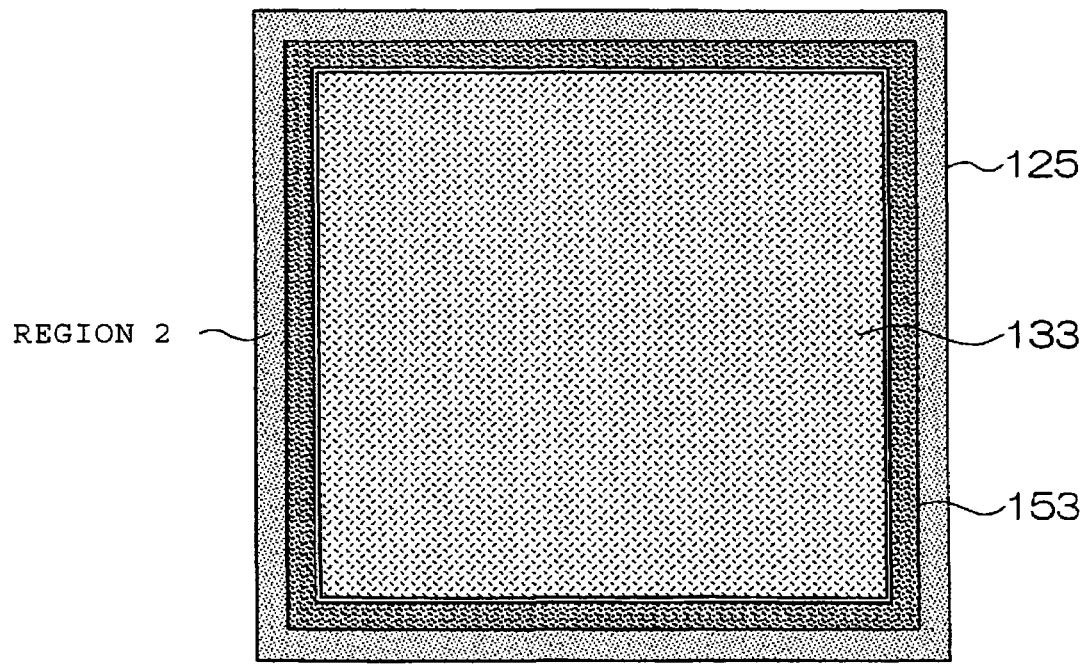
FIG. 3 is a view taken in the direction of arrow A-A in FIG. 1.

When the separators 141 and 142 and the membrane-electrode assembly 137 are assembled, such grooves 145 and 146 will form the gas channels 147 and 148. Further, at the portions of the membrane-catalyst layer assembly 131 where the catalyst layers 127 and 128 are not bonded, gaskets 153 and 154 are located for sealing so that a fuel gas and an oxidant gas will not leak to outside, and therefore, the gas channels 147 and 148 are sealed against outside. Here, a view taken in the direction of arrow A-A in FIG. 1 is shown in FIG. 3.

In such a construction, the sizes of the catalyst layers 127 and 128 are usually different in some degree by the process. Accordingly, in fact, misalignment in some degree may occur also at end edges of the catalyst layers 127 and 128 shown in FIG. 1. Between the end edge of the catalyst layer 127 and the end edge of the catalyst layer 128, one which is closer to the region 1 is defined as the catalyst layer end edge 130 (in the case of FIG. 1, the end edge of the catalyst layer 128 is closer to the region 1 than the end edge of the catalyst layer 127, and therefore, the end edge of the catalyst layer 128 is defined as the catalyst layer end edge 130).

The catalyst layer end edge 130 is disposed so as to be located in the region 2 where the through-holes 117 are not formed in the perforated sheet 113, so that the increase of gas leakage is suppressed even when the pressure is strongly exerted on the catalyst layer end edge 130 during bonding of the electrode or even when the polymer electrolyte membrane 111 is partly damaged by creeping during the operation, whereby it is possible to prevent deterioration of the polymer electrolyte membrane 111 or short circuiting of the electrodes due to e.g. a local burning reaction. Thus, it is possible to provide the membrane-electrode assembly 131 for fuel cells having a long life.

At that time, the distance between the partition line 118 and the catalyst layer end edge 130 is preferably from about 1 to 12 mm, more preferably from about 1 to 6 mm, further preferably from about 2 to 4 mm. If it is less than 1 mm, the gas is likely to bypass the region 2 and permeate through the region 1 so that the effect of suppressing deterioration of the membrane cannot be achieved sufficiently, and if it is more than 12 mm, portions of the catalyst layers which are not used effectively, increase so that the power generation efficiency decreases, such being undesirable.

Further, the gas permeability in the region 2 changes depending upon the material and the thickness of a sheet to be used, the thickness of the ion exchange resin layer, and the type of the gas, but is preferably at most ½, more preferably at most ⅒, of the gas permeability in the region 1. If the gas permeability in the region 2 is more than ½ of the gas permeability in the region 1, the effect of suppressing gas leakage in the region 2 cannot be achieved sufficiently, such being undesirable.

Further, the material for the perforated sheet 113 is preferably one which has substantially no ion exchange groups and which has a water content of at most 5% after immersion in hot water at 90° C. If the water content is more than 5%, creep is likely to occur by the pushing pressure during bonding of the catalyst layers 127 and 128 or during operation of the fuel cell, whereby the polymer electrolyte membrane 111 is damaged and gas permeability increases, such being undesirable.

The average area per through-hole, of the through-holes 117 of the perforated sheet 113 is preferably from $1 \times 10^{-3}$ to 20 mm$^2$, more preferably from about $8 \times 10^{-3}$ to 4 mm$^2$, particularly preferably from about $1.5 \times 10^{-2}$ to 1 mm$^2$. For example, in a case where the average area per through-hole 117 is too small, if it is attempted to maintain the open area ratio within a certain range, the number of the through-holes 117 per unit area is obliged to be so large that the productivity tends to be low or filling of the ion exchange resin tends to be difficult.

On the other hand, in a case where the average area per through-hole 117 is too large, the polymer electrolyte membrane obtainable cannot be uniformly reinforced, and as a result, its strength tends to be insufficient. Accordingly, if the average area per through-hole 117 is set to be from about $1 \times 10^3$ to 20 mm$^2$, the polymer electrolyte membrane 111 can be made to have uniform and sufficient strength for practical use, and have high productivity and sufficient ion conductivity.

Further, the open area ratio in the center region 121 of the perforated sheet 113 having such through-holes 117 formed, is preferably from 30 to 80%, more preferably is from 50 to 75%, particularly preferably from 62 to 70%. Because, for example, if the open area ratio is too low, the ion conductivity is likely to be prevented, and on the other hand, if the open area ratio is too high, the polymer electrolyte membrane 111 obtainable cannot sufficiently be reinforced and its strength is likely to be insufficient.

The sizes or shapes of the through-holes 117 may all be equal, but holes having two or more sizes or shapes may be present as mixed. Further, the shape of the through-hole 117 is not particularly limited, but if it has corners, its strength as the reinforcement tends to be deteriorated because such corners work as notches. Therefore, such a through-hole 117 preferably has a round shape or a shape having no corners.

For formation of the through-holes 117, a method of mechanically perforating a sheet to form the perforated sheet 113, or a method for forming of the perforated sheet 113 by the use of a laser beam, may, for example, be mentioned, but it is preferred to employ the method of mechanically perforating it because such a method is excellent in mass productivity. For example, by a method of mechanically punching it, many through-holes 117 may be formed in a short period of time in such a manner that from a few tens to a few thousands sheets for perforated sheets 113 are laminated and punched by using a punching die which can form from a few hundreds to a few ten thousands through-holes 117 all at once thereto.

Further, it is suitable to employ drilling which can form many through-holes 117 in a short period of time for production at a low cost, in such a manner that from a few tens to a few thousands sheets for the perforated sheets 113 are laminated and drilled by the use of a multiple spindle NC drill. Here, the thickness of such a perforated sheet 113 is preferably from 3 to 50 μm, particularly preferably from 5 to 30 μm, in a case where the polymer electrolyte membrane 111 having such a perforated sheet 113 is employed for polymer electrolyte fuel cells.

For example, if such a perforated sheet 113 is too thin, the polymer electrolyte membrane 111 obtainable may not be reinforced sufficiently and the gas leakage blocking property at the end portions of the catalyst layers in the region 2 may not be secured sufficiently. On the other hand, if such a perforated sheet 113 is too thick, the polymer electrolyte membrane 111 obtainable also becomes too thick, and the ion conduction resistance will be high, whereby the resistance loss will be high and no sufficient performance may be obtained.

Further, although not particularly limited, the thickness of the perforated sheet 113 is desired to be uniform in order that the polymer electrolyte membrane 111 obtainable can uniformly be reinforced. The through-holes 117 in such a perforated sheet 113 are to be filled with an ion exchange resin, whereby the filled layer 114 is to be formed in the perforated sheet 113.

Here, as the ion exchange resin constituting the filled layer 114, a cation exchange resin made of a perfluorocarbon polymer having sulfonic groups is preferred, but as long as it is a cation exchange resin, it is also possible to use e.g. a cation exchange resin made of a hydrocarbon polymer or a partially fluorinated hydrocarbon polymer. Further, the ion exchange resin may be a single one or a mixture of two or more ion exchange resins.

Further, such a filled layer 114 is reinforced by the perforated sheet 113, and therefore, the strength of the filled layer 114 itself may not be so high.

Accordingly, as the ion exchange resin constituting the filled layer 114, it is preferred to use an ion exchange resin having a high ion exchange capacity though not having high strength, so as to increase the electroconductivity of the polymer electrolyte membrane 111 obtainable.

Methods for filling the ion exchange resin in the perforated sheet 113 are not particularly limited, but may, for example, be a method of hot pressing cast membranes formed by e.g. a cast method from a liquid having an ion exchange resin dispersed (dissolved) in a dispersion medium (solvent) (hereinafter referred to as an ion exchange resin-containing liquid), on both outer surfaces of the perforated sheet 113, a method of applying the ion exchange resin-containing liquid on one or both of outer surfaces of the perforated sheet 113, and a method of impregnating the perforated sheet 113 in the ion exchange resin-containing liquid, followed by drying.

Further, such a perforated sheet 113 may be in a state where the filled layer 114 is formed, or may further have a resin layer 125, which is made solely of an ion exchange resin, formed on at least one side or preferably on both sides of the perforated sheet 113.

In such a case, the material for the ion exchange resin constituting the resin layer 125 may be the same or different from that of the ion exchange resin constituting the filled layer 114. In the case of using a different material, it is possible to increase the strength of the resin layer 125 itself, by using, for example, an ion exchange resin having high strength though it has an ion exchange capacity lower than that of the ion exchange resin constituting the filled layer 114.

Figure 5:
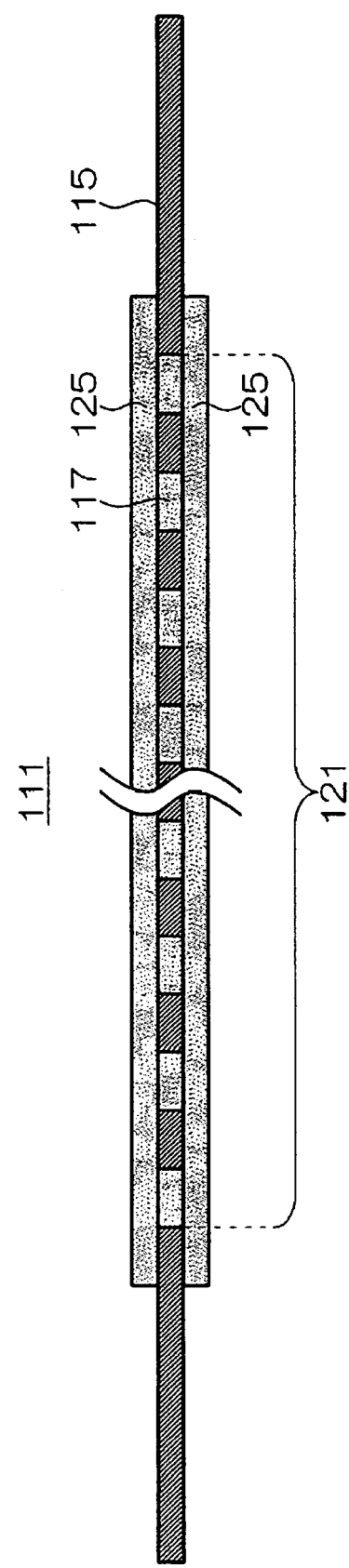
FIG. 5 is a vertically sectional view illustrating another example of the polymer electrolyte membrane.

Further, such resin layers 125 may be formed so as to cover the entire regions on both outer surfaces of the perforated sheet 113 as shown in FIG. 4. However, without being limited thereto, and as shown in FIG. 5, such resin layers 125 may be formed larger than the area of the center region 121 so as to cover the entire center region 121 with the peripheral portion 115 of the perforated sheet 113, which is partly left uncovered.

For the formation of the resin layers 125, such resin layers 125 may be formed by coating during forming of the filled layer 114 on the perforated sheet 113, or may be formed in such a manner that the resin layer 125 is prepared separately and then bonded on the perforated sheet 113 by e.g. hot pressing. Further, the resin layers 125 may be constituted by both the resin layer 125 formed by coating and the resin layer 125 prepared separately.

Further, the ion resin-containing liquid may be applied on the perforated sheet 113 to form the resin layers 125, or layers made of resins may separately be prepared by a cast method, such layers may be disposed on both sides of the perforated sheet 113 and hot-pressed to form the filled layer 114 and the resin layers 125 at the same time. Further, such methods may be repeated or combined to form the resin layers 125.

Thus, the perforated sheet 113 having the filled layer 114 and the resin layers 125 formed as described above, constitutes the polymer electrolyte membrane 111 shown in FIG. 1. The polymer electrolyte membrane 111 may have a plurality of the perforated sheets 113, and in such a case, perforated sheets 113 respectively made of different polymers may be laminated. Further, in such a case, as between the adjacently perforated sheets 113, the respective sides having no resin layers 125 formed, may be in direct contact or the respective resin layers 125 may be in contact with each other.

Figure 6:
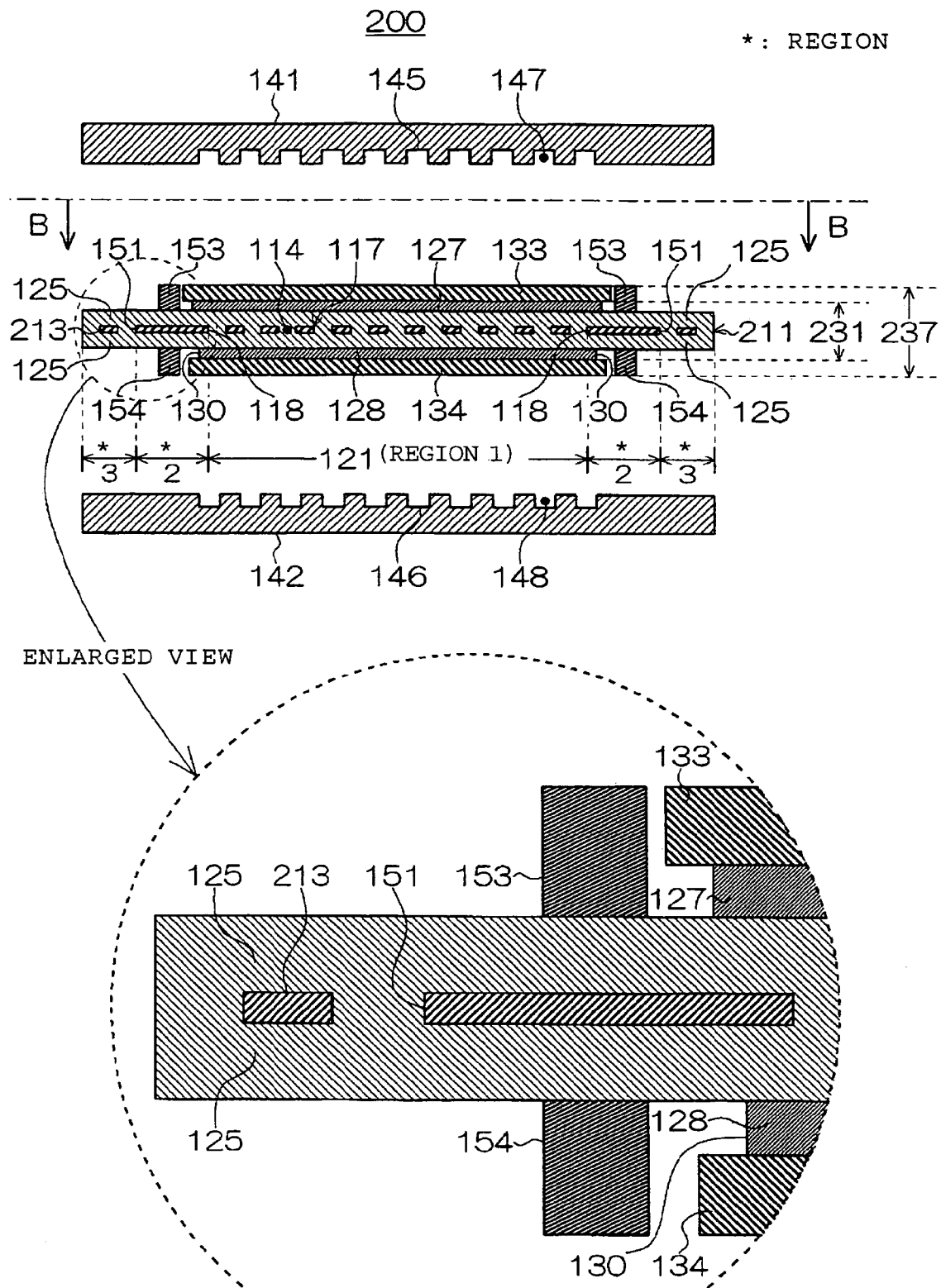
FIG. 6 is a cross-sectional view illustrating another mode of the single cell for fuel cells.
Figure 7:
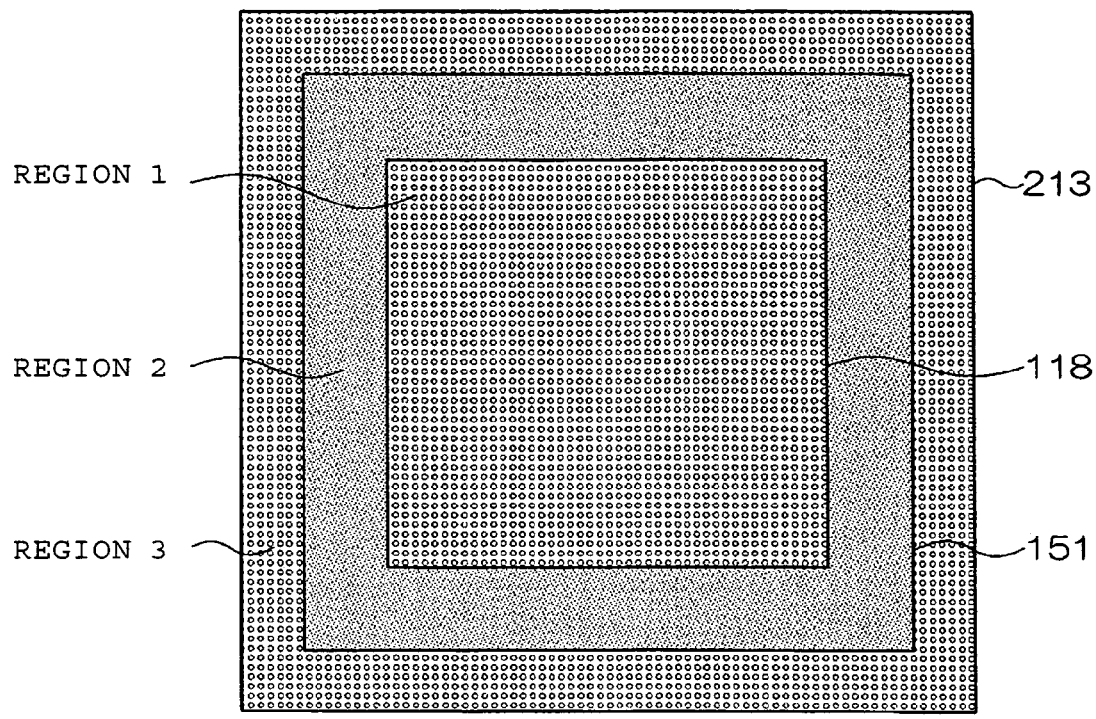
FIG. 7 is a plan view illustrating a perforated sheet of the same as above.
Figure 8:
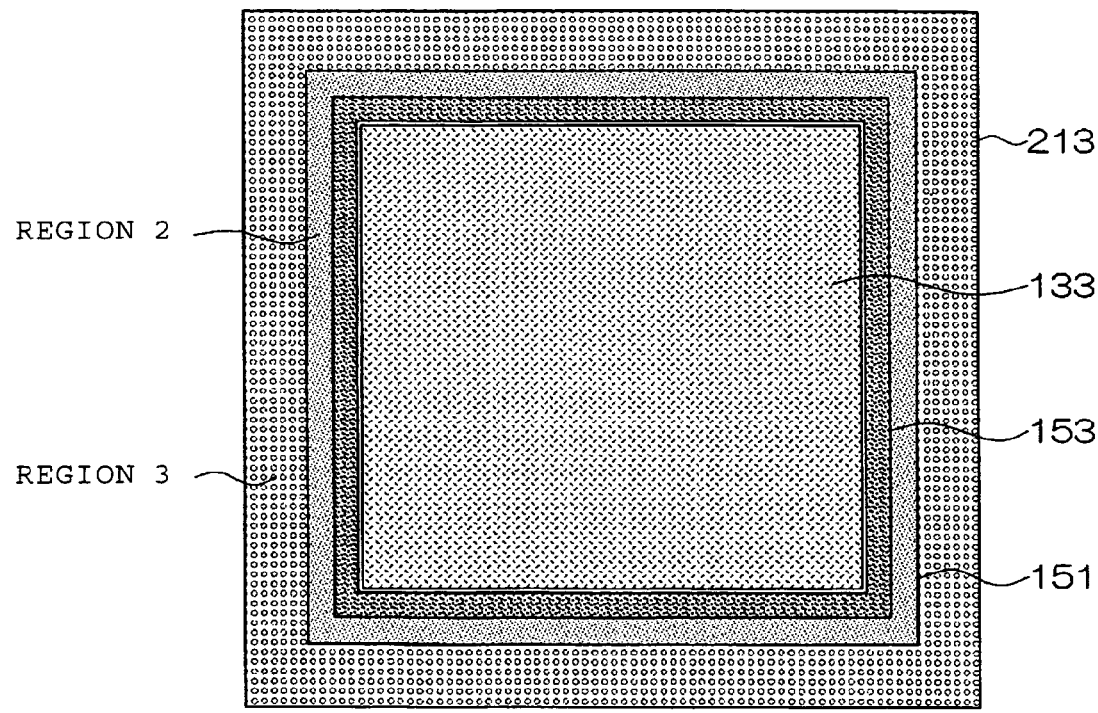
FIG. 8 is a view taken in the direction of arrow B-B in FIG. 6.

Further, FIGS. 6 to 8 show another mode of a single cell for fuel cells as the first embodiment of the present invention. In the cross-sectional view illustrating the singe cell for fuel cells in FIG. 6, the perforated sheet 213 of the single cell 200 has a region 3 having a plurality of through-holes 117 formed on a further outer peripheral portion of the region 2. In such a case, a plan view illustrating the perforated sheet 213 is shown in FIG. 7, and a view taken in the direction of the arrow B-B in FIG. 6 is shown in FIG. 8.

Here, a partition line 151 for partition between the region 2 and the region 3 is virtually defined. Namely, the region 2 is formed in the form of a frame as shown in FIG. 7. Thus, setting of the region 3 allows the ion exchange resins on both surfaces to be connected through the through-holes 117 of the perforated sheet 213 also at the peripheral portion of the membrane, whereby it is possible to prevent peeling of the perforated sheet 213 and the ion exchange resins.

It is desired that the catalyst layer end edge 130 is located at an about center portion of the width of the region 2. Further, such a width of the region 2 is preferably from about 2 to 24 mm, more preferably from about 3 to 12 mm, further preferably from about 4 to 8 mm.

Figure 9:
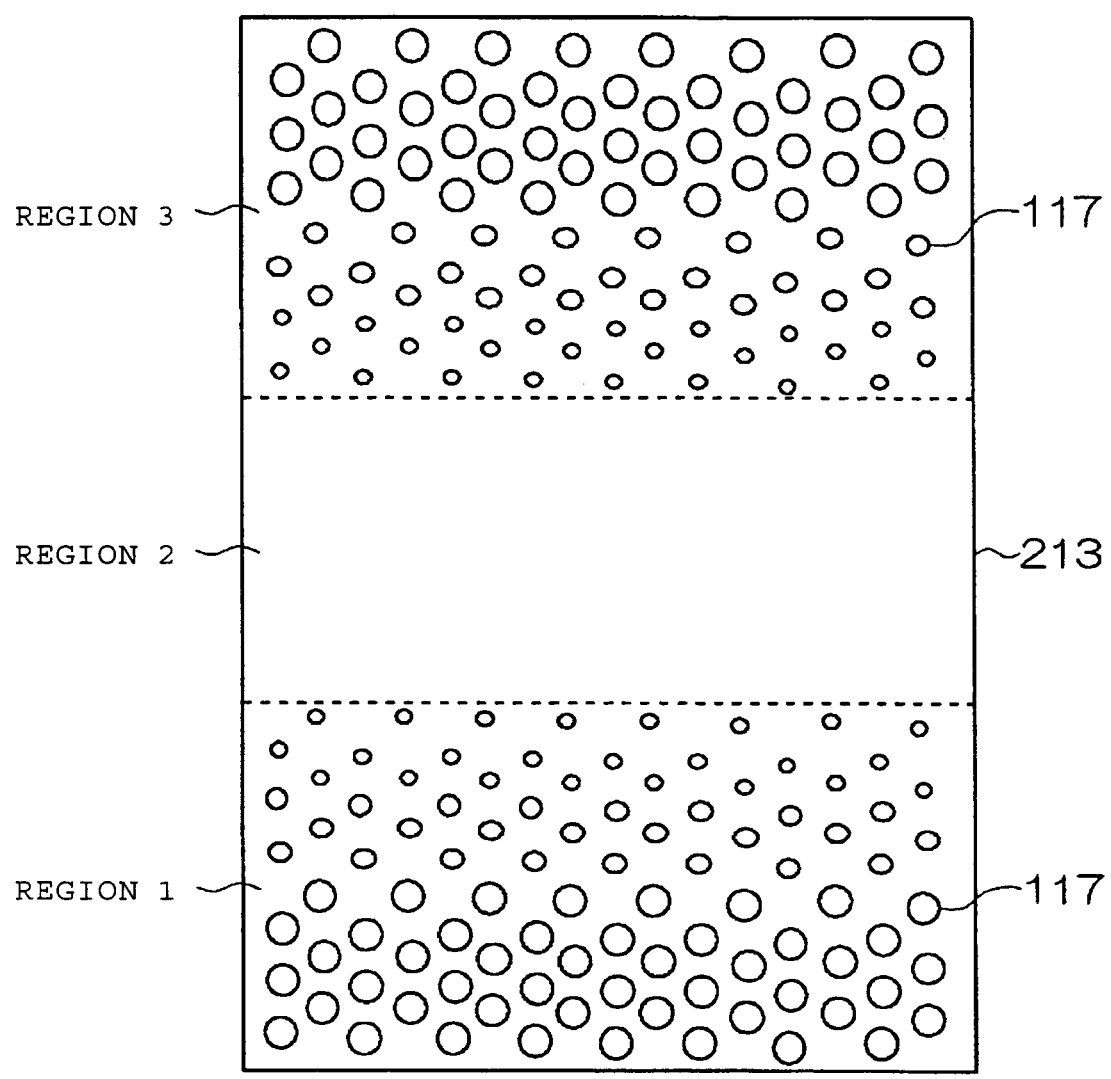
FIG. 9 is a schematic view illustrating a constitutional example of region-boundary portions.
Figure 10:
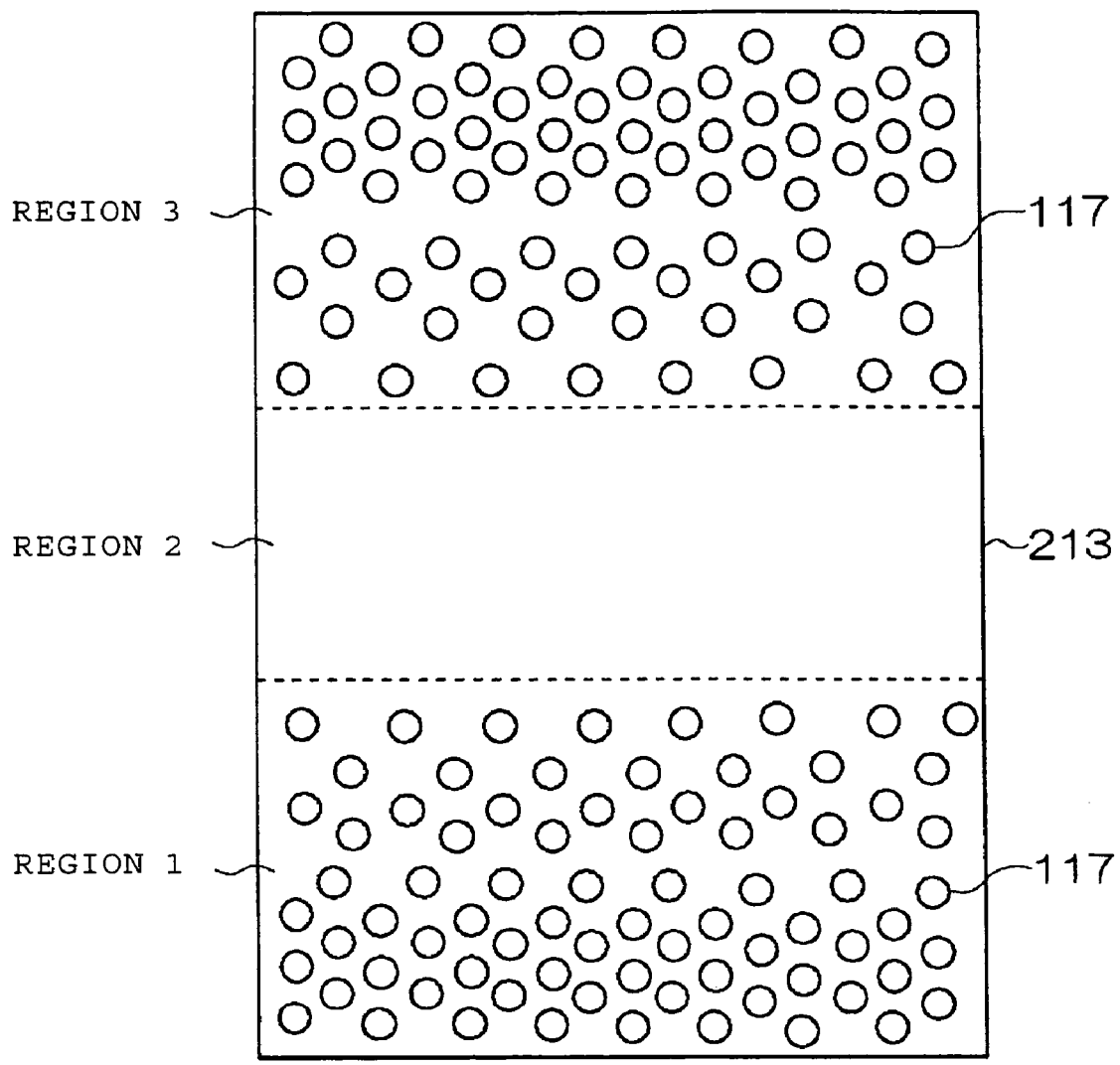
FIG. 10 is a schematic view illustrating another constitutional example of region-boundary portions.

Further, at each or one of the boundary portion between the region 1 and the region 2 and the boundary portion between the region 2 and the region 3, it is preferred that the average area per through-hole 117 gradually becomes small towards the region 2 as shown in FIG. 9. Thus, by decreasing the open area ratio gradually, it is possible to prevent concentration of the stress at the boundary between the region 1 and the region 2 and the boundary between the region 2 and the region 3. For the same reason, the number of the through-holes 117 may gradually be decreased as shown in FIG. 10.

Further, the material (constituting material) for the perforated sheet to be used in the present invention is at least one member selected from the group consisting of a polytetrafluoroethylene, a tetrafluoroethylene/hexafluoropropylene copolymer, a tetrafluoroethylene/perfluoroalkoxyethylene copolymer, a tetrafluoroethylene/ethylene copolymer, a polyethylene, a polypropylene, a polyether amide, a polyether imide, a polyether ketone, a polyether ether ketone, a polysulfone, a polyether sulfone, a polyphenylene sulfide, a polyphenylene oxide, a polyphosphazene, a polyarylate, a polyimide, polyimide amide and a polybenzimidazole.

Such a perforated sheet 113 or 213 may have poor bonding properties depending upon the material, and is preferably surface-treated to improve its bonding properties with the ion exchange resin. The method of surface treatment is not particularly limited, but is suitably a chemical etching treatment, corona discharge treatment, plasma surface treatment or the like.

Figure 11:
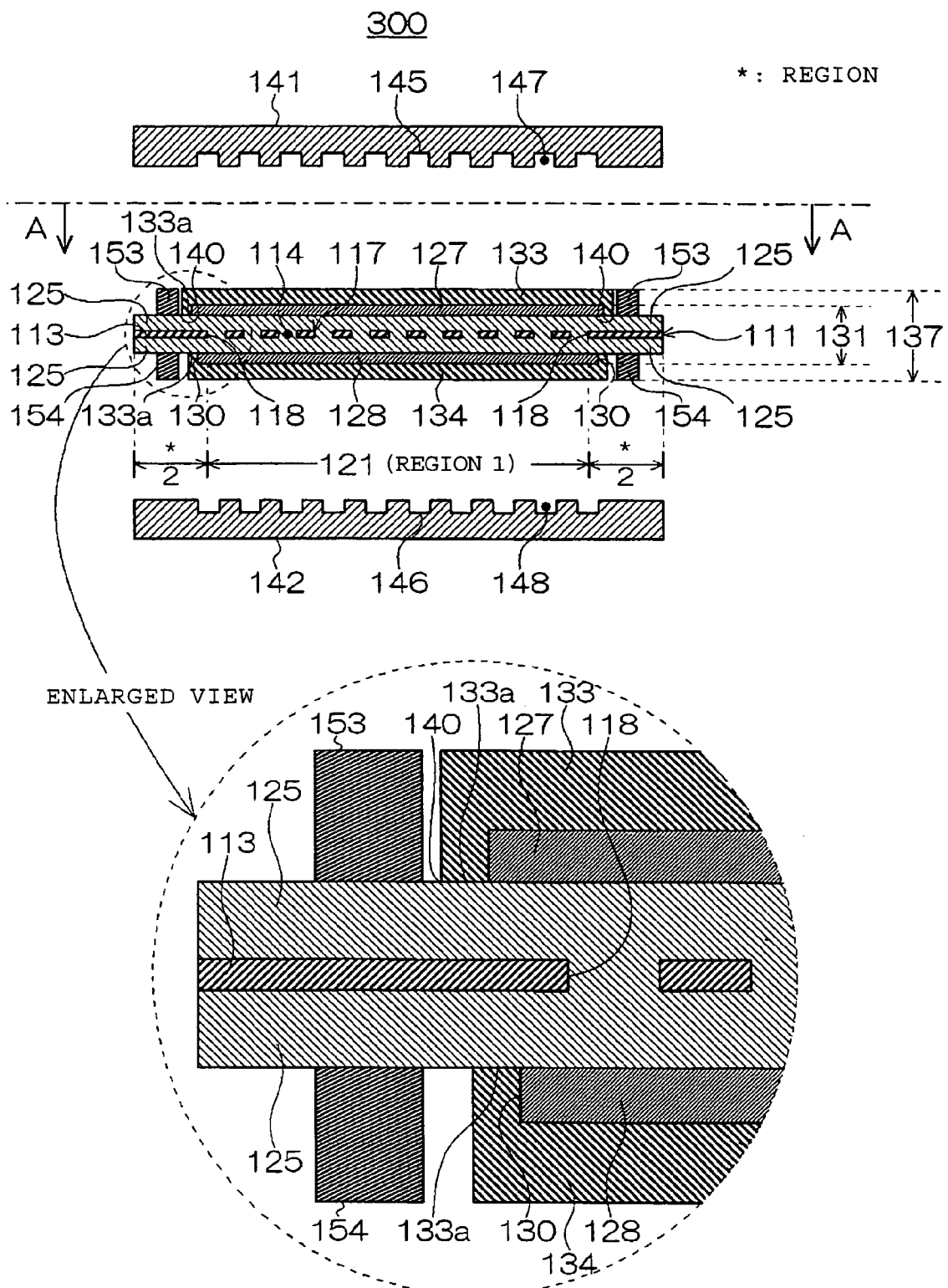
FIG. 11 is a cross-sectional view illustrating a single cell for fuel cells as the second embodiment of the present invention.

Now, the second embodiment of the present invention will be described. The cross-sectional view illustrating a single cell for fuel cells as the second embodiment of the present invention is shown in FIG. 11. Here, with respect to the same elements as shown in FIG. 1, the same symbols are used, and their descriptions are omitted. Further, a plan view illustrating the perforated sheet 113 is the same as FIG. 2, a view taken in the direction of arrow A-A in FIG. 11 is the same as FIG. 3, and a vertically cross-sectional view illustrating the polymer electrolyte membrane 111 is the same as FIG. 4, and such views are therefore omitted.

In the single cell 300 of FIG. 11, the gas diffusion layers 133 and 134 are disposed to cover not only the surfaces of the catalyst layers 127 and 128 but also their sides, and the gas diffusion layers 133 and 134 are in surface contact with the polymer electrolyte membrane 111 at the contact surfaces 133*a*. The gas diffusion layers 133 and 134 are formed from e.g. carbon paper or carbon cloth. Further, such gas diffusion layers are disposed so that the regions of from outer edges of the catalyst layers 127 and 128 to outer edges of the gas diffusion layers 133 and 134 are located in the region 2.

At the portions of the membrane-catalyst layer assembly 131 where the catalyst layers 127 and 128 and gas diffusion layers 133 and 134 are not bonded, gaskets 153 and 154 are located for sealing so that a fuel gas and an oxidant gas will not leak to outside, so that the gas channels 147 and 148 are sealed against outside.

In such a construction, the sizes of the catalyst layers 127 and 128 are usually different in some degree by the process.

Accordingly, in fact, misalignment in some degree may occur also at end edges of the catalyst layers 127 and 128 shown in FIG. 11.

Further, misalignment in some degree may similarly occur also at end edges of the gas diffusion layers 133 and 134 which cover such catalyst layers 127 and 128. Between the end edge of the catalyst layer 127 and the end edge of the catalyst layer 128, one which is closer to the region 1 is defined as the catalyst layer end edge 130 (in the case of FIG. 11, the end edge of the catalyst layer 128 is closer to the region 1 than the end edge of the catalyst layer 127, and therefore, the end edge of the catalyst layer 128 is defined as the catalyst layer end edge 130).

On the other hand, between the end edge of the gas diffusion layer 133 and the end edge of the gas diffusion layer 134, one which is farther to the region 1 is defined as the gas diffusion layer end edge 140 (in the case of FIG. 11, the end edge of the gas diffusion layer 133 is farther from the region 1 than the end edge of the gas diffusion layer 134, and therefore, the end edge of the gas diffusion layer 133 is defined as the gas diffusion layer end edge 140).

The region from the catalyst layer end edge 130 to the gas diffusion layer end edge 140 is disposed so as to be located in the region 2 having a non-perforated sheet disposed, so that the increase of gas leakage is suppressed even when the pressure is strongly exerted on the gas diffusion end edge 140 during bonding of the gas diffusion layer or even when the polymer electrolyte membrane 111 is partly damaged by creeping during the operation, whereby it is possible to prevent deterioration of the polymer electrolyte membrane 111 or short circuiting of the electrodes due to e.g. a local burning reaction. Thus, it is possible to provide the polymer electrolyte membrane-electrode assembly 137 for fuel cells having a long life.

Figure 12:
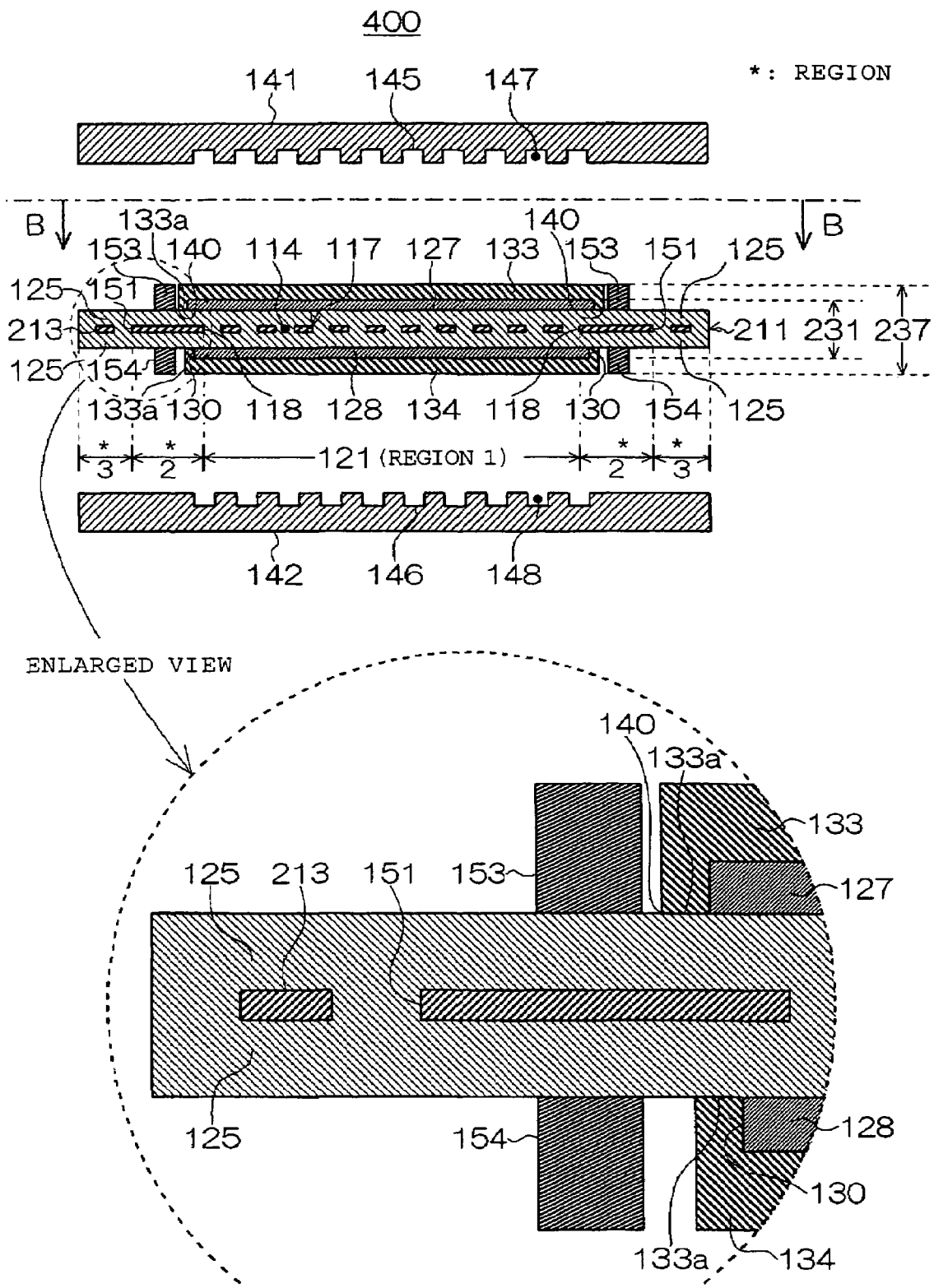
FIG. 12 is a cross-sectional view illustrating the second mode of a single cell for fuel cells as the second embodiment of the present invention.

Further, FIG. 12 shows the second mode of a single cell for fuel cells as the second embodiment of the present invention. In the cross-sectional view illustrating the single cell for fuel cells in FIG. 12, the perforated sheet 213 of a single cell 400 has the region 3 having a plurality of through-holes 117 formed on a farther outer peripheral portion of the region 2. Here, with respect to the same elements as shown in FIG. 6, the same symbols are used, and their descriptions are omitted. Further, in such a case, a plan view illustrating the perforated sheet 213 is the same as in FIG. 7, and a view taken in the direction of B-B arrow in FIG. 12 is the same as in FIG. 8 respectively. Therefore, such views are omitted.

Thus, setting of the region 3 allows the ion exchange resins on both surfaces to be connected through the through-holes 117 of the perforated sheet 213 also at the peripheral portion of the membrane, whereby it is possible to prevent peeling of the perforated sheet 213 and the ion exchange resins. Further, it is desired that the region from the catalyst layer end edge 130 to the gas diffusion layer end edge 140 is located at a center portion in the width of the region 2. Further, such a width of the region 2 is preferably from about 2 to 24 mm, more preferably from about 3 to 12 mm, further preferably from about 4 to 8 mm.

Further, at each or one of the boundary portion between the region 1 and the region 2 and the boundary portion between the region 2 and the region 3, it is preferred that the average area per through-hole 117 gradually becomes small towards the region 2 as shown in FIG. 9. Thus, by decreasing the open area ratio gradually, it is possible to prevent concentration of the stress at the boundary between the region 1 and the region 2 and the boundary between the region 2 and the region 3. For the same reason, the number of the through-holes 117 may gradually be decreased as shown in FIG. 10.

Figure 13:
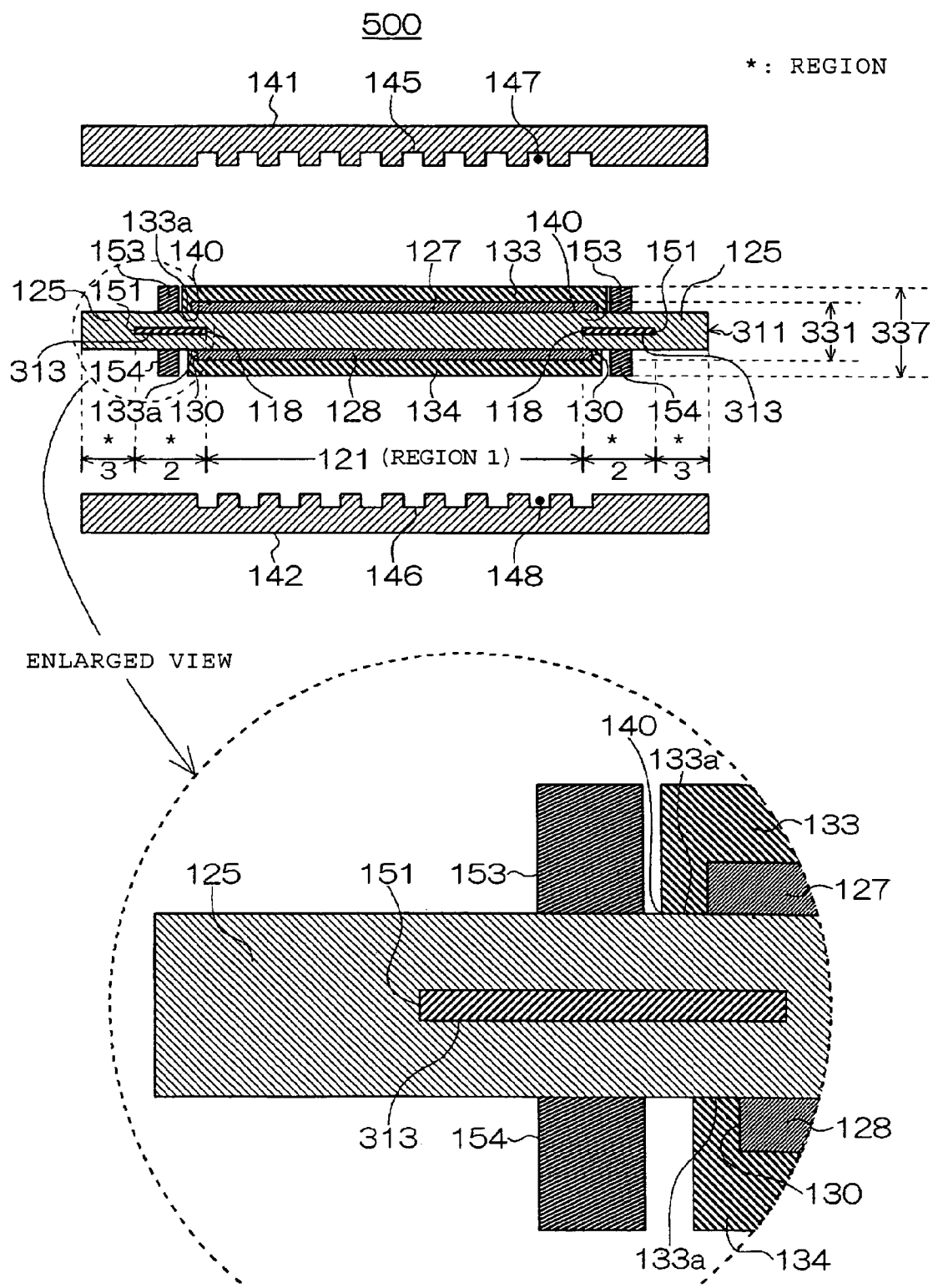
FIG. 13 is a cross-sectional view illustrating the third mode of a single cell for fuel cells as the second embodiment of the present invention.

Now, FIG. 13 shows the third mode (cross-sectional view) of a single cell for fuel cells as the second embodiment of the present invention. In FIG. 13, the region 1 and the region 3 of a polymer electrolyte membrane 311 constituting a single cell 500, are not reinforced by a reinforcement. Only the region 2 is reinforced by a reinforcement 313 made of a non-perforated sheet in the form of a frame. Therefore, the region 1 and the region 3 may be made to be a polymer electrolyte membrane having high proton conductivity.

A membrane-catalyst layer assembly 331 is constituted by the polymer electrolyte membrane 311 and the catalyst layers 127 and 128, and, on both outer surfaces of the membrane-catalyst layer assembly 331 on the side of the catalyst layers 127 and 128, the gas diffusion layers 133 and 134 are respectively disposed. Further, a membrane-electrode assembly 337 is constituted by the membrane-catalyst layer assembly 331 and the gas diffusion layers 133 and 134, and, on both outer surfaces of the membrane-electrode assembly 337 on the side of the gas diffusion layers 133 and 134, gas channels 147 and 148 are formed between them and the separators 141 and 142. By setting the region from the catalyst layer end edge 130 to the gas diffusion layer end edge 140 to be located in the region 2, it is possible to obtain the same effect as the first embodiment or the second embodiment in the embodiment of the present invention.

Figure 14:
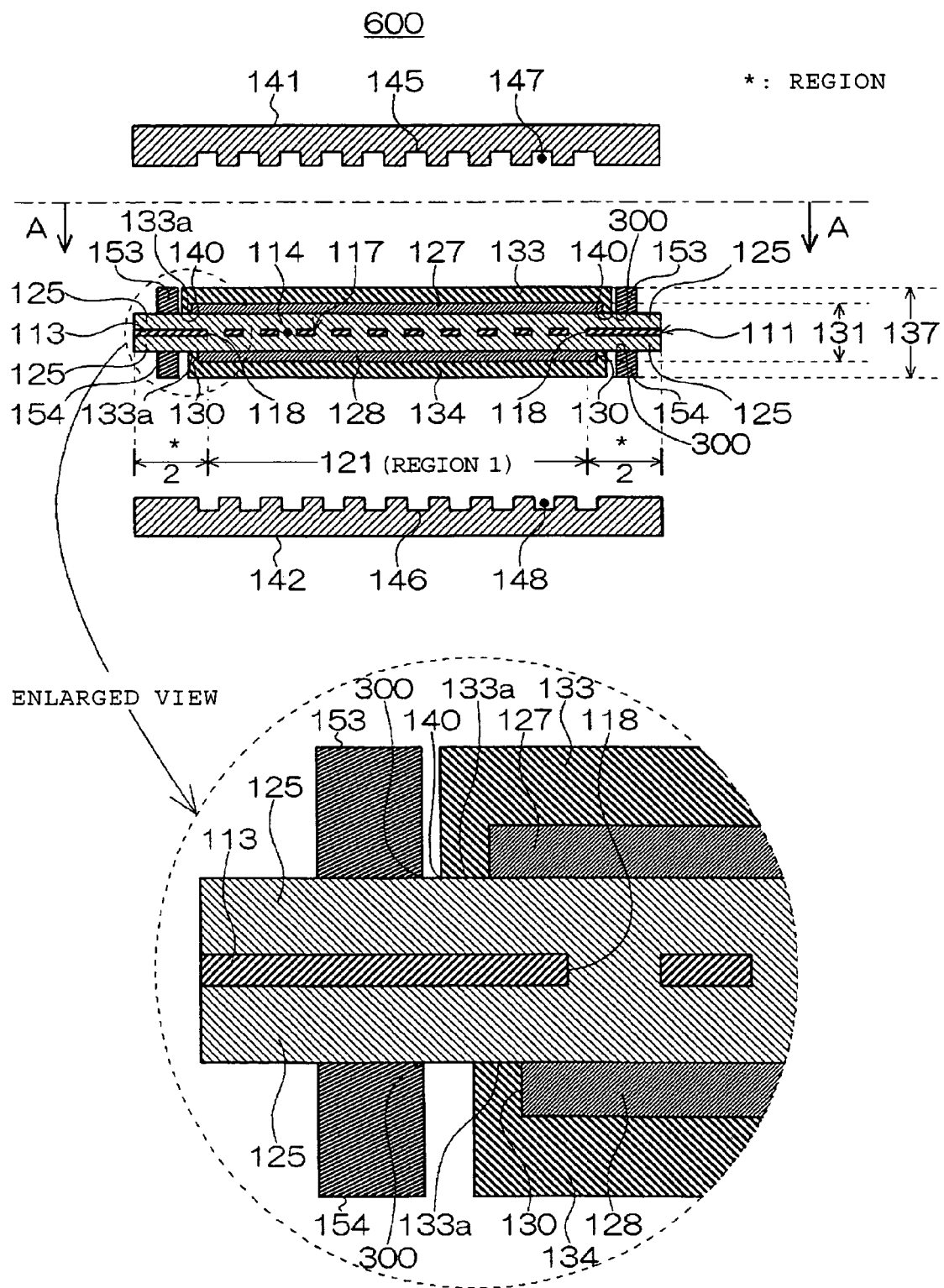
FIG. 14 is a cross-sectional view illustrating a single cell for fuel cells as the third embodiment of the present invention.

Now, the third embodiment of the present invention will be described. FIG. 14 shows a cross-sectional view illustrating a single cell for fuel cells as the third embodiment of the present invention. Here, with respect to the same elements as shown in FIG. 11, the same symbols are used, and their descriptions are omitted. Further, a plan view illustrating the perforated sheet 113 is the same as in FIG. 2, a view taken in the direction of arrow A-A arrow in FIG. 14 is the same as in FIG. 3, and a vertically cross-sectional view illustrating the polymer electrolyte membrane 111 is the same as in FIG. 4 respectively. Therefore, such views are omitted.

In the single cell 600 in FIG. 14, the gas diffusion layers 133 and 134 are disposed so as to cover not only the surfaces of the catalyst layers 127 and 128 but also their sides, and the gas diffusion layers 133 and 134 are in surface contact with the polymer electrolyte membrane 111 at the contact surfaces 133a. Further, such gas diffusion layers are disposed so that the region from outer edges of the catalyst layers 127 and 128 to outer edges of the gas diffusion layers 133 and 134 is located in the region 2. Although not shown in the drawings, the gas diffusion layers 133 and 134 may be disposed only on the catalyst layers 127 and 128 flatly so as not to cover their sides.

Inner peripheral portions of the gaskets 153 and 154 on the side of the catalyst layers 127 and 128 are disposed so as to be located in the region 2. It is desired that such inner peripheral portions 300 of the gaskets 153 and 154 are located at about the center of the region 2.

In such a construction, the inner peripheral portions 300 of the gaskets 153 and 154 are disposed so as to be located in the region 2 having no through-holes formed, so that the increase of gas leakage is suppressed even when the pressure is strongly exerted on the polymer electrolyte membrane 111 during bonding of the gaskets or even when the polymer electrolyte membrane 111 is partly damaged by creeping during the operation, whereby it is possible to prevent deterioration of the polymer electrolyte membrane 111 or short circuiting of the electrode due to e.g. a local burning reaction.

Thus, it is possible to provide the membrane-electrode assembly 137 for fuel cells having a long life. The width of such a region 2 is preferably from about 2 to 24 mm, more preferably from about 3 to 12 mm, further preferably from about 4 to 8 mm.

Figure 15:
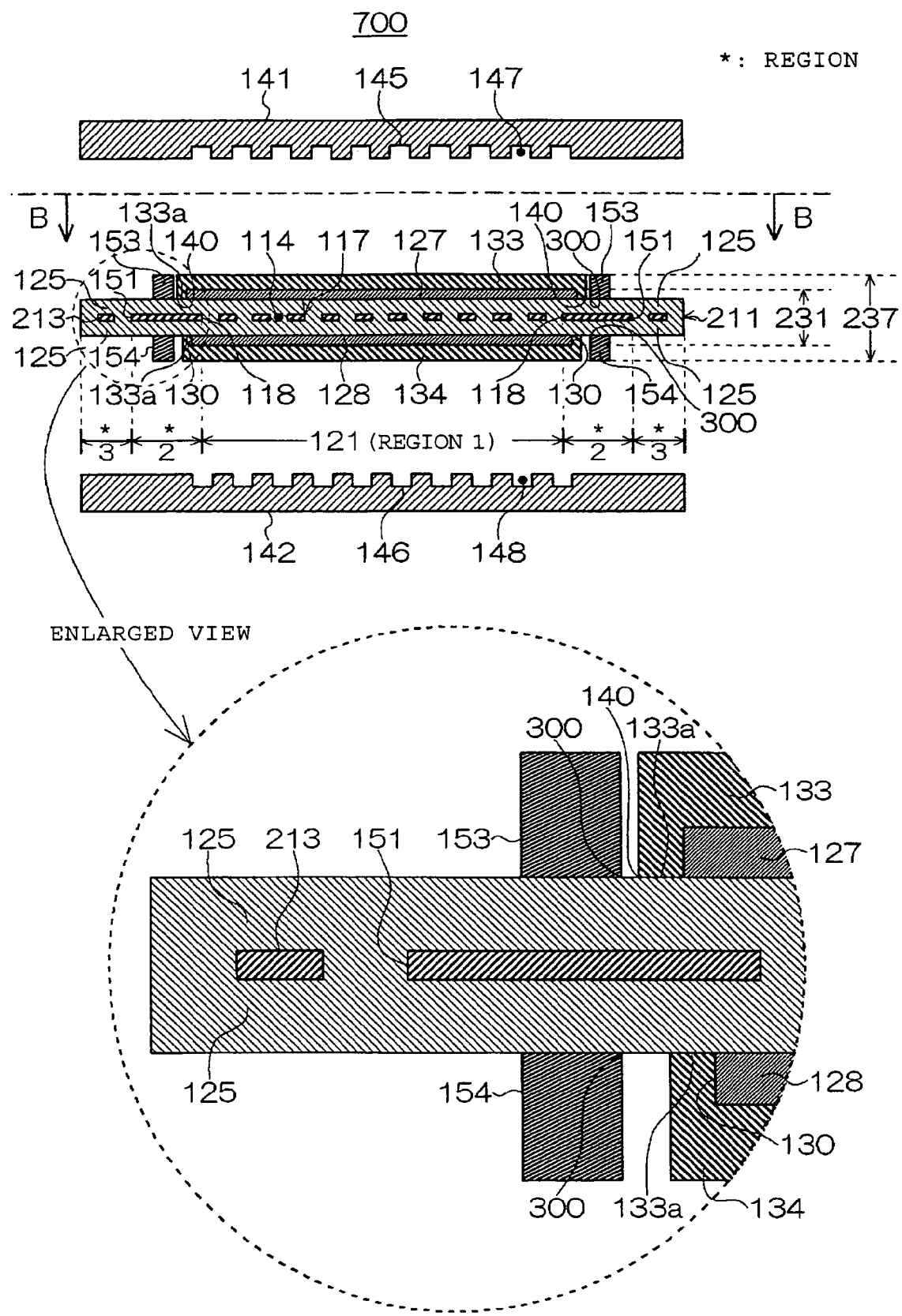
FIG. 15 is a cross-sectional view illustrating the second mode of a single cell for fuel cells as the third embodiment of the present invention.

Further, FIG. 15 shows the second mode of a single cell for fuel cells as the third embodiment of the present invention. In the cross-sectional view illustrating a single cell for fuel cells in FIG. 15, the perforated sheet 213 of a single cell 700 has a region 3 having a plurality of through-holes 117 formed at a farther outer peripheral portion of the region 2. In such a case, a plan view of the perforated sheet 213 is the same as in FIG. 7 and a view taken in the direction of arrow B-B in FIG. 15 is the same as in FIG. 3 respectively. Therefore, such views are omitted.

Thus, setting of the region 3 allows the ion exchange resins on both surfaces to be connected through the through-holes 117 of the perforated sheet 213 also at the peripheral portion of the membrane, whereby it is possible to prevent peeling of the perforated sheet 213 and the ion exchange resins.

EXAMPLES

Example 1

Preparation of Membrane

At a principal center portion of a polyphenylene sulfide film (tradename: Torelina 3030-12, manufactured by Toray Industries, Inc.) of a 200 mm square having a thickness of 12 µm, 213,280 through-holes having a diameter of 300 µm (average area per through-hole: about 0.071 mm$^2$) were formed in a staggered arrangement so as to have a center distance of 350 µm by multiple spindle drilling, to prepare a perforated sheet 113 having a region 1 of a 150 mm square having an open area ratio of is about 67% and a region 2 having no apertures outside thereof.

Then, on a polyethylene terephthalate substrate having a thickness of approximately 100 µm and having the surface treated with a silicone releasing agent (hereinafter, the same substrate as this will be referred to as PET substrate), a dispersion of an ion exchange resin comprising repeating units based on $CF_2=CF_2$ and repeating units based on $CF_2=CF-OCF_2CF(CF_3)-OCF_2CF_2SO_3H$ (ion exchange capacity: 1.1 meq/g dry resin, tradename, Flemion, manufactured by Asahi Glass Company, Limited, hereinafter referred to as dispersion a) was applied by die coating so as to have a total thickness of 15 µm and a 200 mm square, and dried at 90° C. Then, two products thus prepared were disposed to sandwich the porous sheet 113 so that the respective sides coated with the dispersion a were in contact with the porous sheets 113, and then hot-pressed at a temperature of about 150° C. for 20 minutes to obtain the polymer electrolyte membrane 111 shown in FIG. 2.

Measurement of Water Content

After a polyphenylene sulfide film (tradename: Torelina 3030-12, manufactured by Toray Industries, Inc.) of a 200 mm square having a thickness of 12 µm was immersed in hot water of 90° C. for 16 hours, the film was taken out and water on the film surface was wiped out with a filter paper, whereupon the weight was measured. After the measurement, nitrogen was circulated at 25° C. for 16 hours for drying, whereupon the dry weight was measured. The water content was found to be 0.2%. Here, the water content is a water content against the dry weight of the film, and the same applies hereinafter.

Bonding of Electrodes

Further, catalyst layers 127 and 128 are prepared as follows. First, the dispersion a and a supported catalyst having a 55 mass % of platinum supported on carbon are dispersed in a dispersion medium having ethanol and water mixed (at a mass ratio of 1:1), and the catalyst dispersion having a solid content concentration of 14 mass % thus obtained is applied in a 154 mm square at the center portion on one side of a polymer electrolyte membrane 111 to form a catalyst layer 128 having platinum supported in an amount of about 0.4 mg/cm$^2$, as a cathode.

Then, the dispersion a and a supported catalyst having a 50 mass % of an alloy consisting of platinum and ruthenium, supported on carbon, are dispersed in a dispersion medium having ethanol and water mixed (at a mass ratio of 1:1), and the catalyst dispersion having a solid content concentration of 14 mass % thus obtained is applied in a 154 mm square on the center portion on the other side of the polymer electrolyte membrane 111 to form a catalyst layer 127 having platinum supported in an amount of about 0.3 mg/cm$^2$, as an anode, whereby a membrane-catalyst layer assembly 131 is prepared. Then, the contour of such a membrane-catalyst layer assembly 131 is punched by a Thomson die so that the catalyst layer 128 having a 154 mm square is located at its center portion, to obtain a membrane-catalyst layer assembly 131 having a contour of a 165 mm square.

Assembly for Fuel Cell and Evaluation

Then, a gas diffusion layer of a 156 mm square having an electroconductive layer with a thickness of about 10 µm composed of carbon black and polytetrafluoroethylene particles formed on, a carbon cloth substrate with a thickness of about 300 µm is disposed at the center of each side of the membrane-catalyst layer assembly 131 so that such an electroconductive layer is in contact with the membrane-catalyst layer assembly 131. Then, this product is sandwiched between a pair of separators 141 and 142 having gas channels 147 and 148 for supply of reaction gases and between gaskets 153 and 154 for sealing made of fluorine rubber having an inside dimension of a 158 mm square, to obtain a single cell 100 (300, 600) for fuel cells, having an effective electrode area of 225 cm$^2$.

Figure 16:
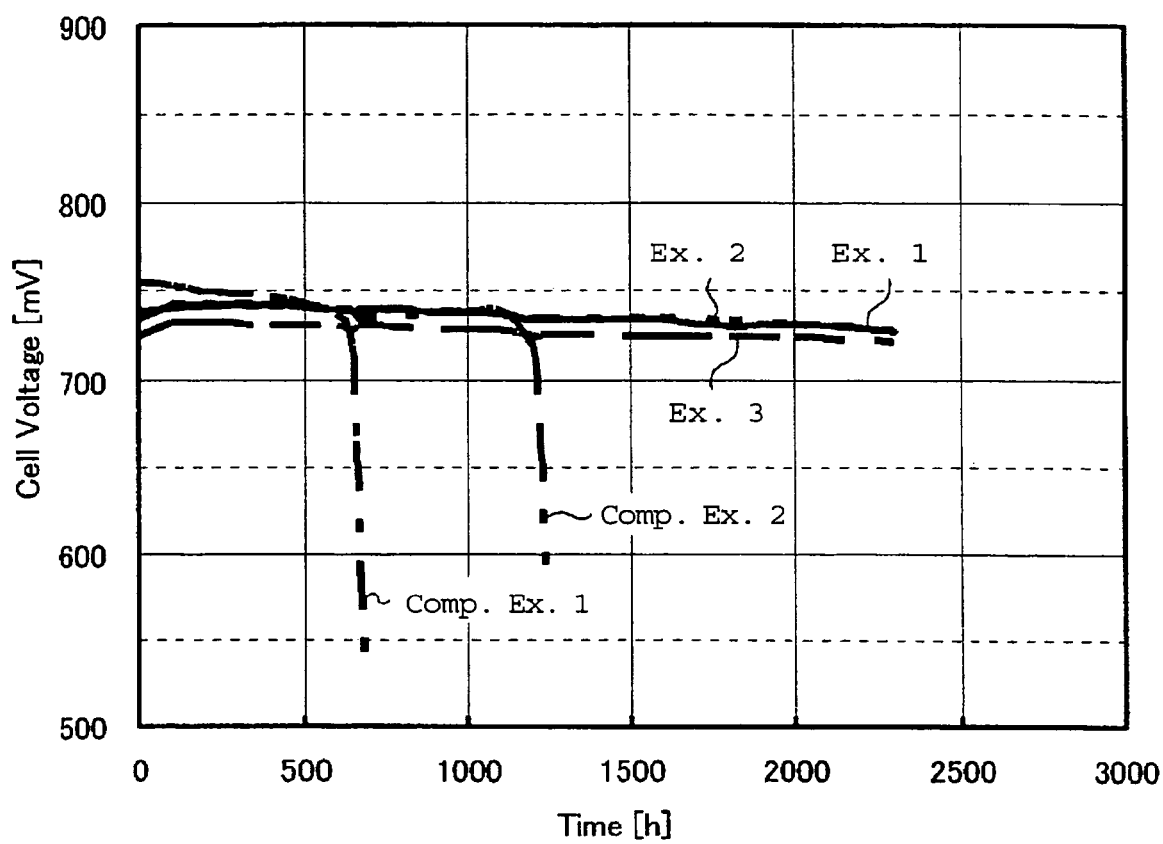
FIG. 16 is a graph showing the relation between the elapsed time and the cell voltage.
Figure 17:
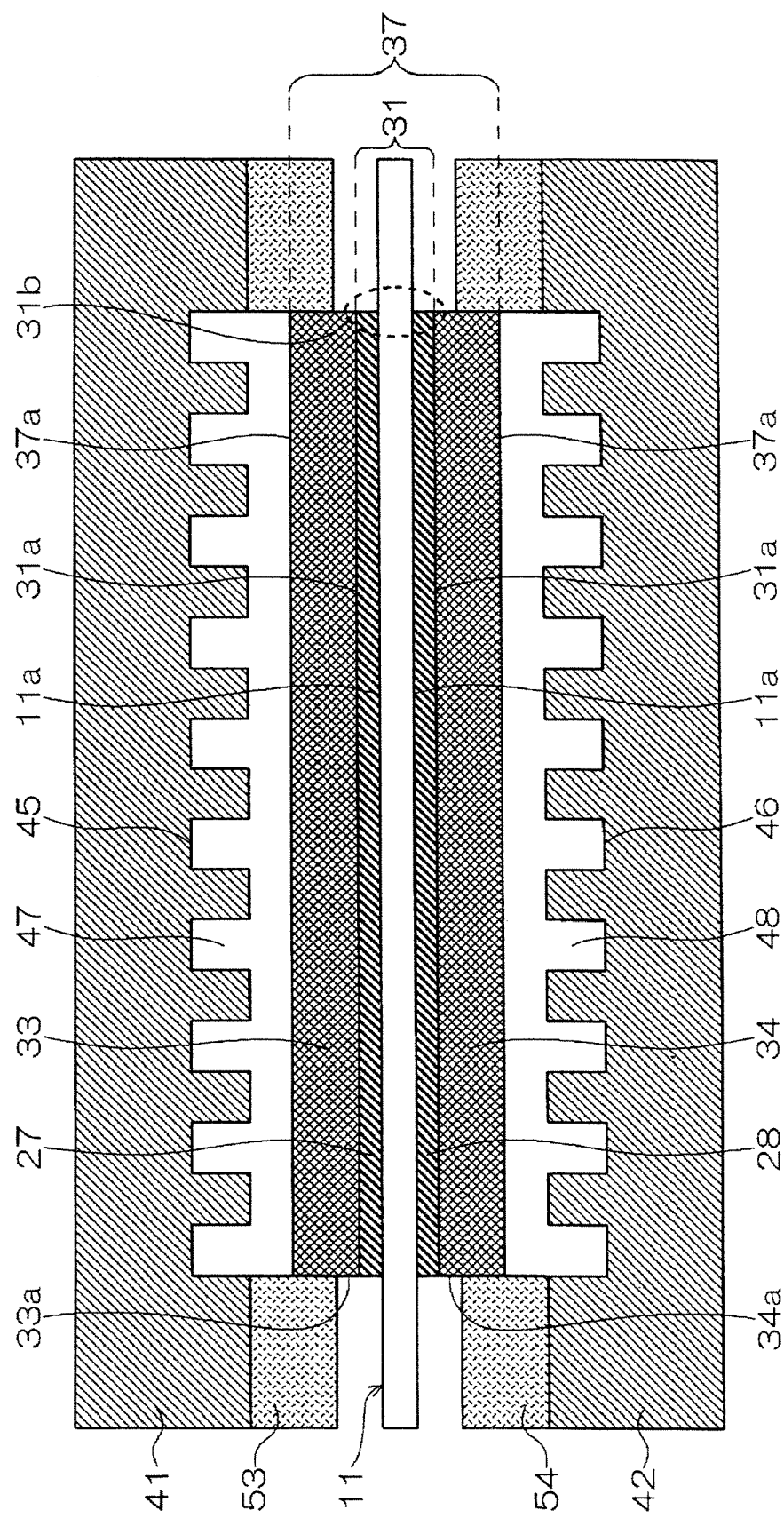
FIG. 17 is a cross-sectional view illustrating an example of a single cell for conventional fuel cells.

Then, the cell temperature of such a single cell 100 (300, 600) is controlled to be 90° C., and hydrogen gas is supplied to the anode side and air is supplied to the cathode side, respectively. Here, the gases are supplied to the fuel cell after humidified so as to have a dew point of 70° C. respectively and so that the utilization rate of hydrogen gas will be 80% and the utilization rate of air will be 50%. As a result, stable operation can be carried out under any current density condition. FIG. 16 shows the relation between the elapsed time and the cell voltage when a continuous operation is carried out at a cell temperature of 90° C. and at a current density of 0.15 A/cm$^2$.

Example 2

Preparation of Membrane

At a principal center portion of a polyphenylene sulfide film (tradename: Torelina 3030-12, manufactured by Toray Industries, Inc.) of a 200 mm square having a thickness of 12 µm, 213,280 through-holes 117 having a diameter of 300 µm (average area per through-hole: about 0.071 mm$^2$) are formed in a staggered arrangement so as to have a center distance of 350 µm by multiple spindle drilling to prepare the region 1 of a 150 mm square with an open area ratio of about 67%, and at outside of a 162 mm square, through-holes 117 having a diameter of 300 μm are formed in a staggered arrangement so as to have a center distance of 350 μm by multiple spindle drilling, to prepare the region 3 with an open area ratio of about 67%, whereby a perforated sheet 213 is prepared in which the region 2 with no apertures has a width of 7 mm.

Then, in the same manner as in Example 1, such a perforated sheet 213 is sandwiched by PET substrates coated with the dispersion a, so that the side of each substrate coated with the dispersion a is in contact with the perforated sheet 213, and hot-pressed at a temperature of about 150° C. for 20 minutes to obtain a polymer electrolyte membrane 211 (corresponding to the polymer electrolyte membrane 111 shown in FIG. 2) shown in FIG. 7.

Bonding of Electrodes

Further, in the same manner as in Example 1, a cathode and an anode are formed on such a polymer electrolyte membrane 211, and its contour is punched by a Thomson die to obtain a membrane-catalyst layer assembly 231 (corresponding to the membrane-catalyst layer assembly 131 shown in FIG. 2) having a contour of a 165 mm square.

Assembly for Fuel Cell and Evaluation

Then, in the same manner as in Example 1, gas diffusion layers 133 and 134 are disposed on such a membrane-catalyst layer assembly 231 to obtain a single cell 200 (400, 700) for fuel cells, having an effective electrode area of 225 cm². Then, the cell temperature of such a single cell 200 (400, 700) is controlled to be 90° C., and hydrogen gas is supplied to the anode side and air is supplied to the cathode side, respectively. Such gases are supplied to the fuel cell after humidified so as to have a dew point of 70° C. respectively and so that the utilization rate of hydrogen gas will be 80% and the utilization rate of air will be 50%. As a result, stable operation can be carried out under any current density condition. FIG. 16 shows the relation between the elapsed time and the cell voltage when a continuous operation is carried out at a cell temperature of 90° C. and at a current density of 0.15 A/cm².

Example 3

Preparation of Membrane

At a principal center of a film made of a perfluoroalkoxyethylene polymer (tradename: TOYOFLON PFA, manufactured by Toray Industries, Inc.) with a thickness of 25 μm, 213,280 through-holes 117 having a diameter of 300 μm (average area per through-hole: about 0.071 mm²) are formed in a staggered arrangement so as to have a center distance of 350 μm by multiple spindle drilling, to prepare the region 1 of a 150 mm square having an open area ratio of about 67%, and at outside of a 162 mm square, through-holes 117 having a diameter of 300 μm are formed in a staggered arrangement so as to have a center distance of 350 μm by the same multiple spindle drilling, to prepare the region 3 with an open area ratio of about 67%, whereby a perforated sheet 213 is prepared in which the region 2 with no apertures has a width of 7 mm in the same manner as in Example 2.

Then, in the same manner as in Example 1, such a perforated sheet 213 was sandwiched by PET substrates coated with the dispersion a, so that the side of each substrate coated with the dispersion a was in contact with the perforated sheet 213, and hot-pressed at about 150° C. for 20 minutes to obtain a polymer electrolyte membrane 211 shown in FIG. 7.

Measurement of Water Content

After a film made of a perfluoroalkoxyethylene polymer (tradename: TOYOFLON PFA, manufactured by Toray Industries, Inc.) with a thickness of 25 μm was immersed in hot water of 90° C. for 16 hours, the film was taken out and water on the film surface was wiped off with a filter paper, whereupon the weight was measured. After the measurement, nitrogen was circulated at 25° C. for 16 hours for drying, whereupon the dry weight was measured. The water content was found to be 0.1%.

Bonding of Electrodes

Further, in the same manner as in Example 1, a cathode and an anode are formed on the polymer electrolyte membrane 211, and its contour is punched by a Thomson die to obtain a membrane-catalyst layer assembly 231 having a contour of a 165 mm square.

Assembly of Fuel Cell and Evaluation

Then, in the same manner as in Example 1, gas diffusion layers 133 and 134 are disposed on such a membrane-catalyst layer assembly 231 to obtain a single cell 200 (400, 700) for fuel cells, having an effective electrode area of 225 cm². Then, the cell temperature of such a single cell 200 (400, 700) is controlled to be 90° C., and hydrogen gas is supplied to the anode side and air is supplied to the cathode side, respectively. Such gases are supplied to the fuel cell after humidified so as to have a dew point of 70° C. respectively and so that the utilization rate of hydrogen gas will be 80% and a utilization rate of air will be 50%. As a result, stable operation can be carried out under any current density condition. FIG. 16 shows the relation between the elapsed time and the cell voltage when a continuous operation is carried out at a cell temperature of 90° C. and at a current density of 0.15 A/cm².

Comparative Example 1

A 30 μm thick ion exchange membrane (ion exchange capacity: 1.1 meq/g dry resin, tradename, Flemion SH-30, manufactured by Asahi Glass Company, Limited) comprising repeating units based on $CF_2=CF_2$ and repeating units based on $CF_2=CF—OCF_2CF\ (CF_3)—OCF_2CF_2SO_3H$, was used as a membrane (hereinafter, this membrane will be referred to as a membrane M1).

Bonding of Electrodes

Then, in the same manner as in Example 1, a cathode and an anode are formed on the membrane M1, and its contour is punched by a Thomson die to obtain a membrane-catalyst layer assembly CCM1 having a contour of a 165 mm square.

Assembly of Fuel Cell and Evaluation

Then, in the same manner as in Example 1, gas diffusion layers 133 and 134 are disposed on such a membrane-catalyst layer assembly CCM1 to obtain a single cell for fuel cells, having an effective electrode area of 225 cm². Then, the cell temperature of such a single cell is controlled to be 90° C., and hydrogen gas is supplied to the anode side and air is supplied to the cathode side, respectively. Such gases are supplied to the fuel cell after humidified so as to have a dew point of 70° C. respectively and so that the utilization rate of hydrogen gas will be 80% and the utilization rate of air will be 50%. As a result, stable operation can be carried out under any current density condition. FIG. 16 shows the relation between the elapsed time and the cell voltage, when a continuous operation is carried out at a cell temperature of 90° C. and at a current density of 0.15 A/cm².

Thus, in a case where a sheet membrane is not provided with regions 1 and 2 and is not reinforced, and it is formed solely of an ion exchange membrane, it is found that the cell voltage abruptly decreases at about a time when the elapsed time is beyond 600 hours.

Comparative Example 2

At a principal center portion of a polyphenylene sulfide film (tradename: Torelina 3030-12, manufactured by Toray Industries, Inc.) of a 200 mm square having a thickness of 12 μm, 275,232 through-holes 117 having a diameter of 300 μm (average area per through-hole: about 0.071 mm$^2$) are formed in a staggered arrangement so as to have a center distance of 350 μm by multiple spindle drilling, to prepare a perforated sheet having an open area ratio of about 67% and having a region of a 170 mm square. Then, in the same manner as in Example 1, such a perforated sheet was sandwiched by PET substrates coated with a dispersion a, so that the side of each substrate coated with the dispersion a was in contact with the perforated sheet, and hot-pressed at about 150° C. for 20 minutes to obtain a polymer electrolyte membrane.

Bonding of Electrodes

Then, in the same manner as in Example 1, a cathode and an anode were formed on such a polymer electrolyte membrane, and its contour was punched by a Thomson die to obtain a membrane-catalyst layer assembly CCM2 having a contour of a 165 mm square.

Assembly of Fuel Cell and Evaluation

Then, in the same manner as in Example 1, gas diffusion layers 133 and 134 were disposed on such a membrane-catalyst layer assembly CCM2 to obtain a single cell for fuel cells, having an effective electrode area of 225 cm$^2$. Then, the cell temperature of such a single cell is controlled to be 90° C., and hydrogen gas is supplied to the anode side and air is supplied to the cathode side, respectively. Such gases are supplied to the fuel cell after humidified so as to have a dew point of 70° C. respectively and so that the utilization rate of hydrogen gas will be 80% and the utilization rate of air will be 50%. As a result, stable operation can be carried out under any current density condition. FIG. 16 shows the relation between the elapsed time and the cell voltage when a continuous operation is carried out at a cell temperature of 90° C. and at a current density of 0.15 A/cm$^2$.

Thus, the perforated sheet is in such a state that only the region 1 is formed alone and no region 2 is formed thereon, whereby the cell voltage abruptly decreases at about a time when the elapsed time is beyond 1,200 hours as shown in FIG. 11.

The entire disclosures of Japanese Patent Application No. 2004-250241 filed on Aug. 30, 2004, Japanese Patent Application No. 2004-250271 filed on Aug. 30, 2004 and Japanese Patent Application No. 2004-250285 filed on Aug. 30, 2004 including specifications, claims, drawings and summaries are incorporated herein by reference in their entireties.

The invention claimed is:

1. A membrane-electrode assembly for polymer electrolyte fuel cells which comprises:
   a polymer electrolyte membrane; and
   electrodes disposed on both sides of the polymer electrolyte membrane;
   wherein
   the electrodes comprise:
   catalyst layers containing a catalyst; and
   gas diffusion layers, at least equal in size to the catalyst layers, disposed on the surfaces of the catalyst layers not in contact with the polymer electrolyte membrane;
   the polymer electrolyte membrane comprises:
   a filled layer, and
   resin layers consisting of an ion exchange resin, coated on both surfaces of the filled layer
   a first central region having proton conductivity in the thickness direction of the polymer electrolyte membrane, wherein the filled layer comprises a reinforcing material comprising void portions and the void portions are filled with the ion exchange resin; and
   a second region peripheral to the first central region wherein the filled layer comprises a non-perforated sheet coated on both surfaces with the resin layers and having no proton conductivity in the thickness direction of the polymer electrolyte membrane;
   the electrodes have an outer edge located on the second region of the polymer electrolyte membrane; and
   the gas diffusion layer support the catalyst layers.

2. The membrane-electrode assembly according to claim 1 wherein both the outer edges of the catalyst layers and the peripheral edges of the gas diffusion layers disposed on the surfaces of the catalyst layers not in contact with the polymer electrolyte membrane are located on the second region of the polymer electrolyte membrane.

3. The membrane-electrode assembly according to claim 2 further comprising gaskets contacting both surfaces of the polymer electrolyte membrane in the second region of the polymer electrolyte membrane, wherein an inner portion of the gaskets is located peripheral to an outer edge of each electrode.

4. The membrane-electrode assembly according to claim 1 further comprising a third region of the polymer electrolyte membrane having proton conductivity in the thickness direction of the polymer electrolyte membrane wherein the third region is located peripheral to an outer edge of the second region of the polymer electrolyte membrane.

5. The membrane-electrode assembly according to claim 4 wherein the first central region having proton conductivity in the thickness direction of the polymer electrolyte membrane and the third region of the polymer electrolyte membrane having proton conductivity in the thickness direction of the polymer electrolyte membrane comprise a filled layer comprising:
   at least one reinforcing material, having void portions selected from the group consisting of a fibrous reinforcing material, a fibrillated reinforcing material, a porous membrane, a woven fabric, a non-woven fabric and a perforated sheet having a plurality of through-holes; and
   an ion exchange resin packed in the void portions of the reinforcing material.

6. The membrane-electrode assembly according to claim 5 wherein the at least one reinforcing material having void portions is a perforated sheet having a plurality of through-holes 7. The membrane-electrode assembly according to claim 6 wherein:
   the through-holes have an average area per through-hole of from $1 \times 10^{-3}$ to 20 mm$^2$;
   the through-holes are substantially parallel to the thickness direction of the perforated sheet; and
   an open area ratio of through-hole area to total area of the third region having proton conductivity is from 30 to 80%.

8. The membrane-electrode assembly according to claim 7 wherein the open area ratio is smaller in a portion of the third region having proton conductivity near the second region peripheral to the first central region than in a portion of the third region having proton conductivity at a greater distance from the second region peripheral to the first central region.

9. The membrane-electrode assembly according to claim 6 wherein the perforated sheet having a plurality of through-holes and the non-perforated sheet of the second region peripheral to the first central region is at least one member selected from the group consisting of a polytetrafluoroethylene, a tetrafluoroethylene/hexafluoropropylene copolymer, a tetrafluoroethylene/perfluoroalkoxyethylene copolymer, a tetrafluoroethylene/ethylene copolymer, a polyethylene, a polypropylene, a polyetheramide, a polyetherimide, a polyether ketone, a polysulfone, a polyphenylene sulfide, a polyphenylene oxide, a polyphosphazene, a polyarylate, a polyimide, a polyamide-imide and a polybenzimidazole.

10. A polymer electrolyte fuel cell comprising the membrane electrode assembly according to claim 9.

11. The membrane-electrode assembly according to claim 5 wherein the perforated sheet having a plurality of through-holes is a material having a water content of at most 5% after completion of immersion in hot water at 90° C.

12. The membrane-electrode assembly according to claim 1 wherein the first central region having proton conductivity in the thickness direction of the polymer electrolyte membrane comprises a filled layer comprising:
   at least one reinforcing material having void portions selected from the group consisting of a fibrous reinforcing material, a fibrillated reinforcing material, a porous membrane, a woven fabric, a non-woven fabric and a perforated sheet having a plurality of through-holes; and
   an ion exchange resin packed in the void portions of the reinforcing material.

13. The membrane-electrode assembly according to claim 12 wherein the at least one reinforcing material having void portions is a perforated sheet having a plurality of through-holes.

14. The membrane-electrode assembly according to claim 13 wherein:
   the through-holes have an average area per through-hole of from $1\times10^{-3}$ to 20 mm$^2$;
   the through-holes are substantially parallel to the thickness direction of the perforated sheet; and
   an open area ratio of through-hole area to total area of the first central region having proton conductivity is from 30 to 80%.

15. The membrane-electrode assembly according to claim 14 wherein the open area ratio is smaller in a portion of the first central region having proton conductivity near the second region peripheral to the first central region than in a central portion of the first central region having proton conductivity.

16. The membrane-electrode assembly according to claim 13 wherein the perforated sheet having a plurality of through-holes is a material having a water content of at most 5% after completion of immersion in hot water at 90° C.

17. The membrane-electrode assembly according to claim 13 wherein the perforated sheet having a plurality of through-holes and the non-perforated sheet of the second region peripheral to the first central region is at least one member selected from the group consisting of a polytetrafluoroethylene, a tetrafluoroethylene/hexafluoropropylene copolymer, a tetrafluoroethylene/perfluoroalkoxyethylene copolymer, a tetrafluoroethylene/ethylene copolymer, a polyethylene, a polypropylene, a polyetheramide, a polyetherimide, a polyether ketone, a polysulfone, a polyphenylene sulfide, a polyphenylene oxide, a polyphosphazene, a polyarylate, a polyimide, a polyamide-imide and a polybenzimidazole.

18. A polymer electrolyte fuel cell comprising the membrane electrode assembly according to claim 17.

19. A polymer electrolyte fuel cell comprising the membrane electrode assembly according to claim 1.

* * * * *